United States Patent
Yang et al.

(10) Patent No.: US 12,457,016 B2
(45) Date of Patent: Oct. 28, 2025

(54) TRANSMISSION AND RECEIVING METHOD; AND APPARATUS FOR USING TRIGGER FRAMES TO SCHEDULE A SECOND ACCESS POINT

(71) Applicant: HUAWEI TECHNOLOGIES CO., LTD., Guangdong (CN)

(72) Inventors: Mao Yang, Xi'an (CN); Bo Li, Xi'an (CN); Yunbo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 402 days.

(21) Appl. No.: 17/468,862

(22) Filed: Sep. 8, 2021

(65) Prior Publication Data

US 2021/0409075 A1  Dec. 30, 2021

Related U.S. Application Data

(63) Continuation of application No. PCT/CN2020/078164, filed on Mar. 6, 2020.

(30) Foreign Application Priority Data

Mar. 8, 2019 (CN) .......................... 201910177084.9

(51) Int. Cl.
*H04W 4/00* (2018.01)
*H04B 7/024* (2017.01)
(Continued)

(52) U.S. Cl.
CPC ........... *H04B 7/024* (2013.01); *H04B 7/0452* (2013.01); *H04W 72/121* (2013.01)

(58) Field of Classification Search
CPC .... H04B 7/024; H04B 7/0452; H04B 7/0413; H04B 7/0408; H04B 7/0617;
(Continued)

(56) References Cited

U.S. PATENT DOCUMENTS

2016/0302229 A1*  10/2016  Hedayat ................ H04L 69/324
2017/0230963 A1*  8/2017  Park ....................... H04L 5/0091
(Continued)

FOREIGN PATENT DOCUMENTS

| CN | 104995982 A | 10/2015 |
| CN | 106686663 A | 5/2017 |

(Continued)

OTHER PUBLICATIONS

Chinese Notice of Allowance issued in Chinese Application No. 201910177084.9 dated Jul. 5, 2022 (5 pages).
(Continued)

*Primary Examiner* — Edan Orgad
*Assistant Examiner* — Hidayat Dabiri

(57) ABSTRACT

Flexible scheduling of a slave AP in a unified frame format in a multi-AP coordinated transmission scenario provides an information transmission method. A first access point (AP) generates a slave trigger frame, where the slave trigger frame includes trigger type information and AP indication information. The trigger type information is used to indicate a type of the slave trigger frame. The AP indication information includes an identifier of a second AP. The identifier of the second AP is used to indicate the second AP. The slave trigger frame is used to trigger the second AP to send a physical protocol data unit (PPDU). The PPDU carries a frame corresponding to a type of the slave trigger frame. The first AP sends the slave trigger frame to the second AP.

10 Claims, 16 Drawing Sheets

(51) Int. Cl.
  *H04B 7/0452* (2017.01)
  *H04W 72/121* (2023.01)
(58) Field of Classification Search
  CPC ............ H04W 72/121; H04W 74/002; H04W 74/04; H04W 72/0446; H04L 5/00; H04L 5/0053
  See application file for complete search history.

(56) References Cited

U.S. PATENT DOCUMENTS

| | | | | |
|---|---|---|---|---|
| 2018/0167879 | A1* | 6/2018 | Kim | H04W 52/02 |
| 2018/0198496 | A1* | 7/2018 | Seok | H04B 7/0452 |
| 2018/0263045 | A1* | 9/2018 | Zhou | H04W 72/12 |
| 2018/0310342 | A1* | 10/2018 | Patil | H04W 74/0833 |
| 2019/0021091 | A1* | 1/2019 | Ko | H04W 74/002 |
| 2019/0132762 | A1* | 5/2019 | Zhu | H04B 7/024 |
| 2020/0403680 | A1* | 12/2020 | Li | H04B 7/0695 |
| 2022/0104257 | A1* | 3/2022 | Ryu | H04W 74/0866 |

FOREIGN PATENT DOCUMENTS

| | | |
|---|---|---|
| CN | 106936553 A | 7/2017 |
| CN | 107005922 A | 8/2017 |
| CN | 107635269 A | 1/2018 |
| CN | 107852766 A | 3/2018 |
| CN | 109315013 A | 2/2019 |
| JP | 5735572 B2 * 6/2015 ............ H04B 7/026 |
| WO | 2018136216 A1 | 7/2018 |

OTHER PUBLICATIONS

Jason Yuchen Guo et al, A unified transmission procedure for multi-AP coordination, IEEE 802.11-19/1102r0, Jul. 2, 2019, 8 pages.
Ron Porat, et al., Broadcom, Constrained Distributed MU-MIMO, IEEE 802.11-18/1439r0, Sep. 4, 2018, 9 pages.
Kiseon Ryu, et al., LG Electronics, Consideration on multi-AP coordination for EHT, 802.11-18/1982r1, Jan. 9, 2019, 10 pages.
IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.
International Search Report and Written Opinion issued in PCT/CN2020/078164, dated Jun. 10, 2020, 9 pages.

* cited by examiner

| Rate (RATE) | Reservation | Length (LENGTH) | Parity (parity) | Signal tail (SIGNAL Tail) |

| Sounding dialog token (Sounding Dialog Token) | Station information 1 (STA Info 1) | ... | Station information n (STA Info n) |

TRANSMISSION AND RECEIVING METHOD; AND APPARATUS FOR USING TRIGGER FRAMES TO SCHEDULE A SECOND ACCESS POINT

CROSS-REFERENCE OF RELATED APPLICATIONS

This application is a continuation of International Application No. PCT/CN2020/078164, filed on Mar. 6, 2020, which claims priority to Chinese Patent Application No. 201910177084.9, filed on Mar. 8, 2019. The disclosures of the aforementioned applications are hereby incorporated by reference in their entireties.

TECHNICAL FIELD

This application relates to the field of communications technologies, and in particular, to an information transmission method, an information receiving method, and an apparatus for a wireless communications system.

BACKGROUND

In a current wireless communications system, a larger bandwidth (for example, 320 MHz) and a larger quantity of streams (for example, 16 spatial streams) may be introduced into extremely high throughput (extremely high throughput, EHT) to improve a throughput and transmission efficiency of the communications system. For example, in the EHT, spatial streams (for example, 16 spatial streams) may be added to improve the throughput capability. However, due to device capability limitations, it is usually difficult for a single access point (access point, AP) to provide 16 spatial streams.

In a scenario where a plurality of APs are used for coordinated transmission, for example, distributed multiple-input multiple output (distributed multiple-input multiple output, D-MIMO) may be used to implement a large quantity of spatial streams, thereby improving throughput and transmission efficiency. D-MIMO may also be referred to as joint transmission (joint transmission). A multi-AP coordination or D-MIMO scenario involves a plurality of APs. The plurality of APs include a master AP and at least one slave AP. The master AP needs to schedule and coordinate the slave APs to implement joint transmission or coordinated transmission of the plurality of APs. However, for different transmission requirements or transmission scenarios, the master AP schedules the slave APs with signaling in different frame formats to meet the transmission requirements, which may cause problems of complex signaling design, inflexible scheduling, and relatively high receiving complexity of the slave APs.

SUMMARY

Embodiments of this application provide an information transmission method and an information receiving method and apparatus that are applied to a wireless communications system, to provide a solution applicable to flexible scheduling of a slave AP in a unified frame format in a coordinated transmission scenario of a plurality of APs.

To resolve the foregoing technical problem, the embodiments of this application provide the following technical solutions:

According to a first aspect, an embodiment of this application provides an information transmission method. The method includes: A first access point (AP) generates a slave trigger frame, where the slave trigger frame includes trigger type information and AP indication information, the trigger type information is used to indicate a type of the slave trigger frame, the AP indication information includes an identifier of a second AP, the identifier of the second AP is used to indicate the second AP, the slave trigger frame is used to trigger the second AP to send a physical protocol data unit (PPDU), and the PPDU carries a frame corresponding to the type of the slave trigger frame; and the first AP sends the slave trigger frame to the second AP.

According to a second aspect, an embodiment of this application further provides an information receiving method. The method includes: A second access point (AP) receives a slave trigger frame sent by a first AP, where the slave trigger frame includes trigger type information and AP indication information, the trigger type information is used to indicate a type of the slave trigger frame, the AP indication information includes an identifier of the second AP, the identifier of the second AP is used to indicate the second AP, the slave trigger frame is used to trigger the second AP to send a physical protocol data unit (PPDU), and the PPDU carries a frame corresponding to the type of the slave trigger frame; and the second AP sends the PPDU to a station (STA) based on the trigger type information and the AP indication information.

The methods in the embodiments of this application may be applied to a scenario of coordinated transmission of a plurality of APs. In the embodiments of this application, the first access point (AP) sends the slave trigger frame. The slave trigger frame includes the trigger type information and the AP indication information. The trigger type information is used to indicate the type of the slave trigger frame. The AP indication information includes the identifier of the second AP. The identifier of the second AP is used to indicate the second AP. The slave trigger frame is used to trigger the second AP to send the physical protocol data unit (PHY protocol data unit, PPDU). The PPDU carries the frame corresponding to the type of the slave trigger frame. An interaction between the first AP and the second AP in the embodiments of this application may be completed by using the slave trigger frame, and the slave trigger frame in the embodiments of this application may carry the trigger type information and the AP indication information to indicate the type of the slave trigger frame and the second AP that sends the PPDU. In this way, information transmission between two or more APs is implemented, and the solution applicable to flexible scheduling of a slave AP in a unified frame format in a coordinated transmission scenario of a plurality of APs is provided. A master AP may flexibly schedule different types of transmission of a slave AP in a unified trigger frame format, thereby reducing complexity of signaling design. The slave AP may parse a trigger frame in a unified parsing manner, thereby reducing complexity of signaling parsing of the slave AP.

In a possible implementation, the type of the slave trigger frame includes at least one of the following: a channel sounding subtype or a data transmission subtype. A slave trigger frame of the channel sounding subtype may be referred to as a channel sounding slave trigger frame, and the channel sounding slave trigger frame is used to trigger the second AP to send a PPDU or a MAC frame required in a channel sounding phase. A slave trigger frame of the data transmission subtype may be referred to as a data slave trigger frame, and the data slave trigger frame is used to trigger the second AP to send a PPDU or a MAC frame required in a data transmission phase.

In a possible implementation, the channel sounding subtype includes at least one of the following: a slave trigger subtype of a null data packet announcement (NDPA), a slave trigger subtype of a null data packet (NDP), or a slave trigger subtype of a beamforming report poll (BFRP); or the data transmission subtype includes at least one of the following: a slave trigger subtype of data or a slave trigger subtype of a multi-user block acknowledgment request (MU-BAR). A slave trigger frame with a subtype of the null data packet announcement may be referred to as an NDPA slave trigger frame (NDPA slave trigger frame), and the NDPA slave trigger frame is used to trigger the second AP to send the NDPA. A slave trigger frame with a subtype of the null data packet may be referred to as an NDP slave trigger frame (NDP slave trigger frame), and the NDP slave trigger frame is used to trigger the second AP to send the NDP. A slave trigger frame with a subtype of the beamforming report poll may be referred to as a beamforming report poll slave trigger frame (BFRP trigger frame), and the beamforming report poll slave trigger frame is used to trigger the second AP to send the beamforming report poll. A slave trigger frame with a subtype of the data may be referred to as a data slave trigger frame (data slave trigger frame), and the data slave trigger frame is used to trigger the second AP to send downlink data. A slave trigger frame with a subtype of the multi-user block acknowledgment request may be referred to as a multi-user block acknowledgment request slave trigger frame (MU-BAR slave trigger frame), and the multi-user block acknowledgment request slave trigger frame is used to trigger the second AP to send the multi-user block acknowledgment request. It may be understood that the slave trigger frame may further include another type. For example, a slave trigger frame with a subtype of trigger may be referred to as a trigger slave trigger frame, and the trigger slave trigger frame is used to trigger the second AP to send a trigger frame to schedule a STA associated with the second AP to send uplink data.

In a possible implementation, the slave trigger frame includes a common information field, a trigger type subfield in the common information field carries the trigger type information, and a plurality of values of the trigger type subfield are in a one-to-one correspondence with a plurality of trigger types of the slave trigger frame; the slave trigger frame includes a common information field, a trigger type subfield in the common information field carries a first value, a trigger dependent common information subfield in the common information field carries the trigger type information, and a plurality of values of the trigger dependent common information subfield are in a one-to-one correspondence with a plurality of trigger types of the slave trigger frame; or the slave trigger frame includes a common information field and a user information field, a trigger type subfield in the common information field carries a first value, a slave trigger frame type subfield in the user information field carries the trigger type information, and a plurality of values of the slave trigger frame type subfield are in a one-to-one correspondence with a plurality of trigger types of the slave trigger frame.

In some embodiments of this application, the common information field includes a trigger type (Trigger Type) field. The trigger type subfield carries the trigger type information and has a plurality of values, and each value of the trigger type subfield corresponds to one trigger type of slave trigger frame. For example, if there are a total of three trigger types of slave trigger frames, the trigger type subfield may have at least three values, and each value of the trigger type subfield corresponds to a different trigger type of slave trigger frame.

For another example, a value 8 of the trigger type subfield represents a null data packet announcement slave trigger frame (NDPA slave trigger); a value 9 of the trigger type subfield represents a null data packet slave trigger frame (NDP slave trigger); a value 10 of the trigger type subfield represents a beamforming report poll slave trigger frame (BFRP slave trigger); a value 11 of the trigger type subfield represents a data slave trigger frame (data slave trigger); a value 12 of the trigger type subfield represents a multi-user block acknowledgment request slave trigger frame (MU-BAR slave trigger); and the value of the trigger type subfield may alternatively be any value of 13 to 15, and in this case, an indication function of the trigger type subfield is reserved for subsequent expansion. It may be understood that a trigger type corresponding to the value of the trigger type subfield may be changed.

In some embodiments of this application, the common information field includes a trigger type subfield and a trigger dependent common information subfield. The trigger type subfield and a trigger association dependent common information field are used to jointly indicate the type of the slave trigger frame, that is, to jointly indicate the trigger type information. The trigger type subfield carries a first value, indicating that the trigger frame is a slave trigger frame. The first value may be any value of 8 to 15, for example, 8. Further, the trigger dependent common information subfield (Trigger Dependent Common Info) indicates the subtype of the slave trigger frame. A plurality of values of the trigger dependent common information subfield are in a one-to-one correspondence with a plurality of trigger types of the slave trigger frame.

In some embodiments of this application, the slave trigger frame includes a common information field and a user information (User Info) field. The common information field includes a trigger type subfield. The trigger type subfield carries a first value, and the first value is used to indicate that the trigger frame is a slave trigger frame. For example, the first value may be 8. This is merely an example herein, and does not limit the first value from having another value. When the trigger type subfield carries the first value, further, the user information field includes a slave trigger frame type (slave TF type) subfield. The slave trigger frame type (slave TF type) field carries the trigger type information. A plurality of values of the slave trigger frame type subfield are in a one-to-one correspondence with a plurality of trigger types of the slave trigger frame.

In a possible implementation, the slave trigger frame includes a user information field, and an association identifier (AID) subfield in the user information field carries the AP indication information; or the slave trigger frame includes a user information field, an association identifier subfield in the user information field is a special AID, and a trigger dependent user information subfield in the user information field carries the AP indication information. In the embodiments of this application, the user information field includes an association identifier (association ID, AID) field, and the association identifier subfield carries the AP indication information. The association identifier subfield may directly carry the identifier of the second AP. For example, the association identifier subfield may carry a negotiated slave AP AID. The slave trigger frame includes the user information field, and the user information field includes the association identifier subfield and the trigger dependent user information subfield. A value of the association identifier subfield is a special AID. The special AID may be an AID value that is not used or defined, for example, it may be 4094, 4095, or another preset value. This is not limited herein. When the value of the association identifier subfield is a special AID, the second AP may further parse the trigger dependent user information subfield in the user information field, to obtain the AP indication information from the trigger dependent user information subfield.

In a possible implementation, the identifier of the second AP is at least one of the following: a basic service set (BSS) identifier (ID) corresponding to the second AP, a basic service set color corresponding to the second AP, an association identifier of the second AP, or a media access control (MAC) address of the second AP. The BSS ID corresponding to the second AP may include a group identifier (Group ID) corresponding to the second AP. The identifier of the second AP may further include the group identifier corresponding to the second AP and a basic service set bitmap (BSS bitmap) corresponding to the second AP. Specifically, a set including a plurality of APs may be referred to as one AP group. One second AP may be classified into at least one AP group, and a group identifier of the AP group to which the second AP belongs may be used as identification information of the second AP. The AP group may be a D-MIMO group, and the group identifier corresponding to the second AP may be a distributed multiple-input multiple-output (distributed multiple-input multiple-output, D-MIMO) group identifier corresponding to the second AP. Each D-MIMO group includes a slave AP belonging to the D-MIMO group. Different group identifiers may be assigned to different slave APs, and the slave APs may be identified based on the group identifiers of the slave APs. For another example, because one basic service set usually includes one AP, a basic service set color of a basic service set to which the second AP belongs may be used as identification information of the second AP. For another example, the group identifier and the basic service set bitmap that correspond to the second AP may be used as identification information of the second AP. It is assumed that a preset quantity of slave APs exist in one D-MIMO group, and an order of the slave APs is known. In this case, whether a corresponding slave AP needs to participate in current channel sounding may be indicated based on that each bit in a bitmap corresponds to one slave AP, and the slave AP that needs to participate in the current channel sounding may be identified based on the group identifier and the bitmap that correspond to the slave AP. For another example, the AID of the second AP may be used as identification information of the second AP, where the AID of the second AP may be pre-assigned by the first AP to the second AP; or the MAC address of the second AP is used as identification information of the second AP. A specific implementation for the identification information of the second AP is not specifically limited in the embodiments of this application. In some embodiments of this application, optionally, to indicate one or more STAs to which the second AP sends the PPDU, the first AP includes identification information of the one or more STAs in the slave trigger frame.

In a possible implementation, the slave trigger frame is a data slave trigger frame, the PPDU carries a data frame, and the data slave trigger frame includes a transmission identifier field of the data frame. The first AP may include the transmission identifier (Transmission ID) field in the slave trigger frame to indicate a data frame triggered by the data slave trigger frame, to be specific, the first AP triggers the data frame carried by the PPDU sent by the second AP. The transmission identifier field included in the data slave trigger frame is used to indicate a data frame that needs to be exchanged by the first AP. In this way, a problem that a to-be-exchanged data frame cannot be determined when a plurality of data frames need to be exchanged between the first AP and the second AP is resolved.

In a possible implementation, the data slave trigger frame includes a common information field. The common information field includes at least one of the following: a trigger dependent common information subfield, an uplink spatial reuse subfield, or a reserved subfield. The trigger dependent common information subfield includes the transmission identifier field, the uplink spatial reuse subfield includes the transmission identifier field, or the reserved subfield includes the transmission identifier field. Therefore, the transmission identifier field may be carried by using any one of the trigger dependent common information subfield, the uplink spatial reuse subfield, or the reserved subfield. A specific manner for carrying the transmission identifier field may be determined based on an application scenario. For example, if a master AP may exchange a plurality of data frames with a slave AP, a data frame to be transmitted in current coordination may be indicated in a slave trigger frame. Therefore, a transmission ID needs to be introduced into the slave trigger frame to identify a data frame that needs to be transmitted in coordination. The transmission ID may be carried in the trigger dependent common info subfield. The transmission ID may alternatively be carried in another field, for example, an UL spatial reuse subfield in common info. Because a frame after the slave trigger frame is a downlink frame, a UL spatial reuse subfield in the downlink frame may be used to carry the transmission ID. The transmission ID may alternatively be carried in a reserved (reserved) subfield in the common info field.

In a possible implementation, the slave trigger frame is a data slave trigger frame. The PPDU carries a data frame. The data frame includes a multi-user (MU) PPDU type field. The MU PPDU type field is used to indicate a type of the data frame. The MU PPDU type field is a second value, indicating that the data frame is an intra-basic service set MU PPDU; or the MU PPDU type field is a third value, indicating that the data frame is an inter-basic service set MU PPDU. In this case, the slave trigger frame is a data slave trigger frame, and the data slave trigger frame triggers the data frame, to be specific, the first AP triggers the data frame carried by the PPDU sent by the second AP. The MU PPDU type field is used to indicate the type of the data frame.

In a possible implementation, the slave trigger frame further includes transmission parameter information. The transmission parameter information is used to indicate a transmission parameter of the PPDU. The slave trigger frame includes the common information field. The trigger dependent common information subfield in the common information field carries the transmission parameter information. The first AP may indicate, by using the slave trigger frame, the transmission parameter of the PPDU sent by the second AP, and the transmission parameter of the PPDU may include physical layer-related information and MAC layer-related information. For example, different slave trigger frames may carry different scheduling signaling. The common information field includes the trigger dependent common information subfield, and the trigger dependent common information subfield may be used to carry the transmission parameter information, so that the first AP can indicate the transmission parameter of the PPDU sent by the second AP.

According to a third aspect, an embodiment of this application provides a communications apparatus on a first access point side. The apparatus may be a first access point, or may be a chip in a first access point. The apparatus has a function of implementing the first access point according to the first aspect. The function may be implemented by hardware, or may be implemented by hardware executing corresponding software. The hardware or software includes one or more units corresponding to the foregoing function.

In a possible implementation, when the apparatus is the first access point, the first access point includes a processor and a transceiver. The processor is configured to support the first access point (AP) in performing corresponding functions in the foregoing methods. The transceiver is configured to: support the first access point (AP) in communicating with a second access point (AP), and send a slave trigger frame to the second access point. Optionally, the first access point may further include a memory. The memory is configured to be coupled to the processor, and stores program instructions and data that are necessary for the first access point.

In the third aspect, this embodiment of this application provides the communications apparatus. The apparatus is applied to the first access point (AP). The communications apparatus includes the processor and the transceiver. The processor is configured to generate a slave trigger frame. The slave trigger frame includes trigger type information and AP indication information. The trigger type information is used to indicate a type of the slave trigger frame. The AP indication information includes an identifier of the second AP. The identifier of the second AP is used to indicate the second AP. The slave trigger frame is used to trigger the second AP to send a physical protocol data unit (PPDU). The PPDU includes a frame corresponding to the type of the slave trigger frame. The processor is further configured to send the slave trigger frame to the second AP by using the transceiver.

According to a fourth aspect, this application provides a communications apparatus on a second access point side. The apparatus may be a second access point, or may be a chip in a second access point. The apparatus has a function of implementing the second access point according to the second aspect. The function may be implemented by hardware, or may be implemented by hardware executing corresponding software. The hardware or software includes one or more units corresponding to the foregoing function.

In a possible implementation, when the apparatus is the second access point, the second access point includes a processor and a transceiver. The processor is configured to support the second access point (AP) in performing corresponding functions in the foregoing methods. The transceiver is configured to support the second access point (AP) in communicating with the second access point (AP) or a station, for example, receive a slave trigger frame sent by the first access point. Optionally, the second access point may further include a memory. The memory is configured to be coupled to the processor, and stores program instructions and data that are necessary for the second access point.

Any one of the foregoing processors may be a general-purpose central processing unit (Central Processing Unit, CPU for short), a microprocessor, an application-specific integrated circuit (application-specific integrated circuit, ASIC for short), or one or more integrated circuits configured to control program execution of the spatial multiplexing methods in the foregoing aspects.

In the fourth aspect, this embodiment of this application provides the communications apparatus. The apparatus is applied to the second access point (AP). The communications apparatus includes the processor and the transceiver. The processor is configured to receive, by using the transceiver, the slave trigger frame sent by the first AP. The slave trigger frame includes trigger type information and AP indication information. The trigger type information is used to indicate a type of the slave trigger frame. The AP indication information includes an identifier of the second AP. The identifier of the second AP is used to indicate the second AP. The slave trigger frame is used to trigger the second AP to send a physical protocol data unit (PPDU). The PPDU carries a frame corresponding to the type of the slave trigger frame. The processor is further configured to send, based on the trigger type information and the AP indication information, the PPDU to a station (STA) by using the transceiver.

In a possible implementation, the type of the slave trigger frame includes at least one of the following: a channel sounding subtype or a data transmission subtype.

In a possible implementation, the channel sounding subtype includes at least one of the following: a slave trigger subtype of a null data packet announcement (NDPA), a slave trigger subtype of a null data packet (NDP), or a slave trigger subtype of a beamforming report poll (BFRP); or the data transmission subtype includes at least one of the following: a slave trigger subtype of data or a slave trigger subtype of a multi-user block acknowledgment request (MU-BAR).

In a possible implementation, the slave trigger frame includes a common information field, a trigger type subfield in the common information field carries the trigger type information, and a plurality of values of the trigger type subfield are in a one-to-one correspondence with a plurality of trigger types of the slave trigger frame; the slave trigger frame includes a common information field, a trigger type subfield in the common information field carries a first value, a trigger dependent common information subfield in the common information field carries the trigger type information, and a plurality of values of the trigger dependent common information subfield are in a one-to-one correspondence with a plurality of trigger types of the slave trigger frame; or the slave trigger frame includes a common information field and a user information field, a trigger type subfield in the common information field carries a first value, a slave trigger frame type subfield in the user information field carries the trigger type information, and a plurality of values of the slave trigger frame type subfield are in a one-to-one correspondence with a plurality of trigger types of the slave trigger frame.

In a possible implementation, the slave trigger frame includes a user information field, and an association identifier (AID) field in the user information field carries the AP indication information; or the slave trigger frame includes a user information field, an association identifier subfield in the user information field is a special AID, and a trigger dependent user information subfield in the user information field carries the AP indication information.

In a possible implementation, the identifier of the second AP is at least one of the following: a basic service set (BSS) identifier (ID) corresponding to the second AP, a basic service set color corresponding to the second AP, an association identifier of the second AP, or a media access control (MAC) address of the second AP.

In a possible implementation, the slave trigger frame is a data slave trigger frame, the PPDU carries a data frame, and the data slave trigger frame includes a transmission identifier field of the data frame.

In a possible implementation, the data slave trigger frame includes a common information field. The common information field includes at least one of the following: a trigger dependent common information subfield, an uplink spatial reuse subfield, or a reserved subfield. The trigger dependent common information subfield includes the transmission identifier field, the uplink spatial reuse subfield includes the transmission identifier field, or the reserved subfield includes the transmission identifier field.

In a possible implementation, the slave trigger frame is a data slave trigger frame. The PPDU carries a data frame. The data frame includes a multi-user (MU) PPDU type field. The MU PPDU type field is used to indicate a type of the data frame. The MU PPDU type field is a second value, indicating that the data frame is an intra-basic service set MU PPDU; or the MU PPDU type field is a third value, indicating that the data frame is an inter-basic service set MU PPDU.

In a possible implementation, the slave trigger frame further includes transmission parameter information. The transmission parameter information is used to indicate a transmission parameter of the PPDU. The slave trigger frame includes the common information field. The trigger dependent common information subfield in the common information field carries the transmission parameter information.

According to a fifth aspect, this application provides a computer-readable storage medium. The computer-readable storage medium stores instructions, and the instructions may be executed by one or more processors on or of a processing circuit. When the instructions are run on a computer, the computer is enabled to perform the method according to the first aspect or the second aspect.

According to a sixth aspect, a computer program product including instructions is provided. When the computer program product runs on a computer, the computer is enabled to perform the method according to the first aspect or the second aspect or any possible implementation of the first aspect or the second aspect. The computer program product may be completely or partially stored in a storage medium encapsulated in a processor, or may be completely or partially stored in a storage medium encapsulated outside a processor.

According to a seventh aspect, an embodiment of this application provides a wireless communications system. The system includes the first access point and at least one second access point in the foregoing aspects.

DESCRIPTION OF EMBODIMENTS

Figure 1:
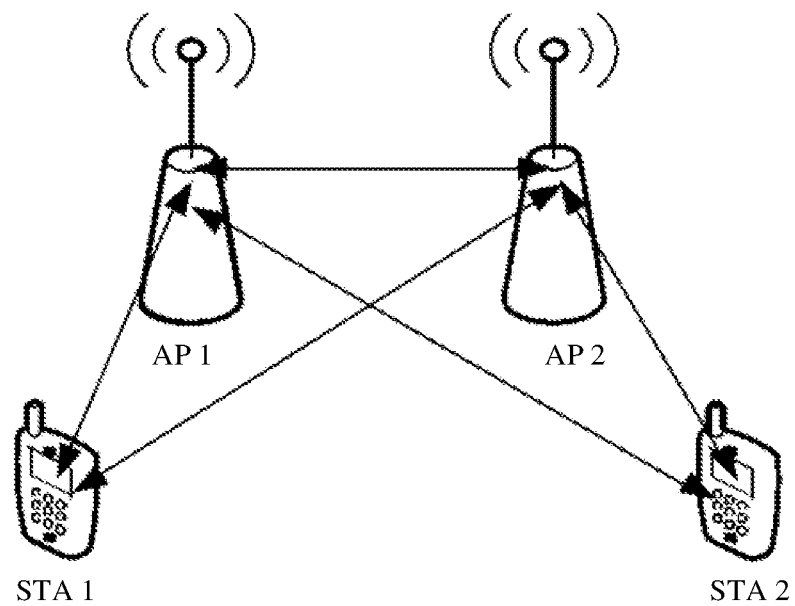
FIG. 1 is a schematic diagram of a composition structure of a communications system according to an embodiment of this application.

Embodiments of this application provide an information transmission method and an information receiving method and apparatus that are applied to a wireless communications system, to provide a solution applicable to flexible scheduling of a slave AP in a unified frame format in a coordinated transmission scenario of a plurality of APs.

The following describes the embodiments of this application with reference to the accompanying drawings.

In the specification, claims, and accompanying drawings of this application, the terms "first", "second", and so on are intended to distinguish between items but do not necessarily indicate a specific order or sequence. It should be understood that the terms used in such a way are interchangeable in proper circumstances, which is merely a way to discriminate that is used when objects having a same attribute are described in the embodiments of this application. In addition, the terms "include", "contain" and any other variants mean to cover the non-exclusive inclusion, so that a process, method, system, product, or device that includes a series of units or features is not necessarily limited to those units or features, but may include other units or features not expressly listed or inherent to such a process, method, system, product, or device.

The technical solutions in the embodiments of this application may be applied to a communications system for coordinated transmission of a plurality of APs. The coordinated transmission of the plurality of APs may be coordinated transmission performed by a plurality of antennas of the plurality of APs, or the coordinated transmission of the plurality of APs may be coordinated transmission performed by a plurality of antennas of one (the same) AP. For example, a specific implementation scenario of the coordinated transmission of the plurality of APs may be D-MIMO transmission. D-MIMO means that antennas at a transmit end are distributed antennas, and is also generally referred to as coordinated MIMO and AP joint transmission (Joint Transmission). D-MIMO is an implementation in AP coordinated transmission. By using a D-MIMO technology, more combined antennas of a plurality of nodes can be fully utilized, and a higher rate can be provided by using more spatial flows, or a longer transmission distance can be provided by using channel diversity. Antennas distributed at different nodes can provide better antenna isolation, and channels are more independent. Therefore, more spatial flows can be supported. For example, the D-MIMO is communication between one or more STAs in an AP group, and a plurality of APs may be connected in a wired or wireless manner. For another example, in D-MIMO, one access controller (access controller, AC) may centrally control a plurality of APs to perform transmission.

In a scenario of coordinated transmission of a plurality of APs, the plurality of APs may be divided into one master AP and at least one slave AP. The master AP may coordinate and schedule the at least one slave AP to perform coordinated or joint transmission. It should be noted that the master AP may be a fixed AP in the plurality of APs, or may be any one of the plurality of APs. A method for determining the master AP is not specifically limited in the embodiments of this application. Two different architectures are specifically involved in the scenario of the coordinated transmission of the plurality of APs that is provided in the embodiments of this application: One is that the master AP participates in joint sending, to be specific, the master AP and the slave AP send a PPDU to a STA together. The other is that the master AP does not participate in joint sending, and a plurality of slave APs perform joint sending. In the scenario in which the master AP does not participate in joint sending, at least two slave APs jointly send the PPDU to the STA. The solution in the embodiments of this application is also applicable to a scenario in which a master AP schedules one slave AP.

As shown in FIG. 1, an example of a communications system provided in an embodiment of this application may include an AP 1, an AP 2, a (e.g., non-AP) STA 1, and a (e.g., non-AP) STA 2. The AP 1 may be a first access point (access point, AP) in this embodiment of this application, and the AP 2 may be a second AP in this embodiment of this application. The first AP and the second AP may implement multi-AP coordinated transmission or multi-AP joint transmission. The first AP and the second AP each include at least one antenna, and coordinated transmission of the at least one antenna of the first AP and the at least one antenna of the second AP may also be referred to as distributed multiple-input multiple-output (D-MIMO) transmission or coordinated MIMO transmission. For example, the first AP may be a master AP, namely, the AP 1 in FIG. 1; the second AP may be a slave AP, namely, the AP 2 in FIG. 1; the first STA may be the STA 1 in FIG. 1; and the second STA may be the STA 2 in FIG. 1. The first AP may communicate with the second AP, for example, in a wired or wireless manner. In this embodiment of this application, an example in which the first AP is a master AP and the second AP is a slave AP is used for description. The first AP and the master AP may be alternately used, and the second AP and the slave AP may be alternately used. It may be understood that, a quantity of APs and a quantity of STAs in the communications system are merely examples.

The access point is an apparatus having a wireless communication function. In the communications system, a device that connects a station to a communications network may be referred to as, for example, a radio access network (radio access network, RAN) node (or device) or a base station. Currently, some examples of the access point are: a transmission reception point (transmission point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (base band unit, BBU), a Wi-Fi access point, and another interface device that can work in a wireless environment.

A station is a device that has a wireless connection function and that can provide voice and/or data connectivity for a user, and may also be referred to as a terminal device, user equipment (user equipment, UE), a mobile station (mobile station, MS), a mobile terminal (mobile terminal, MT), or the like. Currently, some examples of the station include: a mobile phone (mobile phone), a tablet computer, a notebook computer, a handheld computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in smart grid (smart grid), a wireless terminal in transportation safety (transportation safety), a wireless terminal in a smart city (smart city), a wireless terminal in a smart home (smart home), and a vehicle-mounted device.

The technical solution in this embodiment of this application may be applied to various data processing communications systems, for example, a code division multiple access (code division multiple access, CDMA) system, a time division multiple access (time division multiple access, TDMA) system, a frequency division multiple access (frequency division multiple access, FDMA) system, an orthogonal frequency division multiple access (orthogonal frequency division multiple access, OFDMA) system, a single carrier frequency division multiple access (single carrier FDMA, SC-FDMA) system, and another system. The terms "system" and "network" can be interchanged with each other. The CDMA system may implement radio technologies such as universal terrestrial radio access (universal terrestrial radio access, UTRA) and CDMA2000. The UTRA may include a wideband CDMA (wideband WCDMA, WCDMA) technology and another CDMA variant technology. The CDMA2000 may cover the interim standard (IS) 2000 (IS-2000), IS-95 and IS-856 standards. The TDMA system may implement a wireless technology such as a global system for mobile communications (global system for mobile communications, GSM). The OFDMA system may a wireless technology such as evolved universal terrestrial radio access (E-UTRA), ultra mobile broadband (ultra mobile broadband, UMB), IEEE 802.11 (Wi-Fi), IEEE 802.16 (WiMAX), IEEE 802.20, or Flash OFDMA. UTRA and E-UTRA are evolved versions of UMTS and UMTS. Various versions of 3GPP in long term evolution (long term evolution, LTE) and LTE-based evolution are new versions of UMTS using E-UTRA. A fifth generation (5 Generation, "5G" for short) communications system and new radio (New Radio, "NR" for short) are next-generation communications systems under study. In addition, the communications system may further be applicable to a future-oriented communications technology, and all technical solutions provided in the embodiments of this application are applicable. The system architecture and the service scenario described in the embodiments of this application are intended to describe the technical solutions in the embodiments of this application more clearly, and do not constitute a limitation on the technical solutions provided in the embodiments of this application. A person of ordinary skill in the art will understand that: With the evolution of the network architecture and the emergence of new service scenarios, the technical solutions provided in the embodiments of this application are also applicable to similar technical problems.

Figure 2:
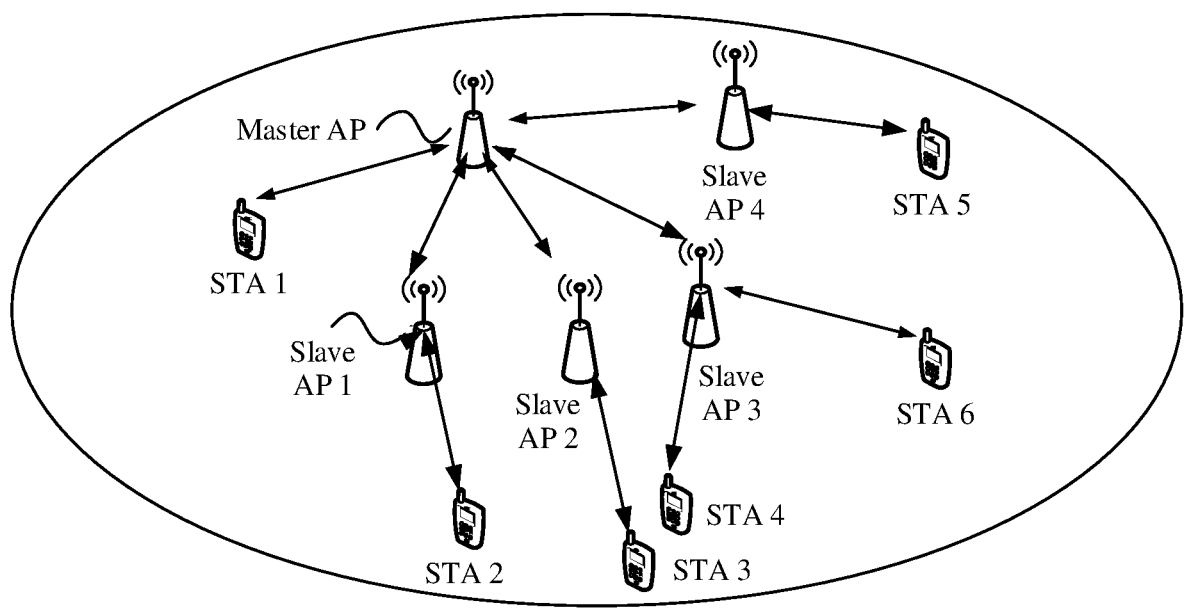
FIG. 2 is a schematic structural diagram of another communications system according to an embodiment of this application.

FIG. 2 is a schematic structural diagram of another communications system according to an embodiment of this application. The communications system shown in FIG. 2 includes: a master AP, a slave AP 1, a slave AP 2, a slave AP 3, a slave AP 4, and STAs 1 to 6. In this embodiment of this application, a first AP may be the foregoing master AP; and a second AP may be the foregoing slave AP 1, slave AP 2, slave AP 3, or slave AP 4. In FIG. 2, the master AP may form D-MIMO with the slave AP 1, the slave AP 2, the slave AP 3, and the slave AP 4; the master AP may form D-MIMO with the slave AP 1, the slave AP 2, and the slave AP 3; the master AP may form D-MIMO with the slave AP 1 and the slave AP 2; or the master AP may form D-MIMO with the slave AP 1.

The communications system provided in this embodiment of this application may perform communication by using a plurality of Wi-Fi standards. The plurality of Wi-Fi standards may include an existing high-throughput (high-throughput, HT) Wi-Fi standard, a very high throughput (very high throughput, VHT) Wi-Fi standard, a high efficiency (high efficiency, HE) Wi-Fi standard, or a next-generation Wi-Fi standard, for example, an extremely high throughput (Extremely high throughput, EHT) Wi-Fi standard or a very high efficiency (very high efficiency, VHE) Wi-Fi standard. In a subsequent embodiment, an example in which the next-generation Wi-Fi standard is EHT is used to describe the solutions in the embodiments of this application.

The methods in the embodiments of this application may be applied to a scenario of coordinated transmission of a plurality of APs. In the embodiments of this application, a first access point (AP) sends a slave trigger frame. The slave trigger frame includes trigger type information and AP indication information. The trigger type information is used to indicate a type of the slave trigger frame. The AP indication information includes an identifier of a second AP. The identifier of the second AP is used to indicate the second AP. The slave trigger frame is used to trigger the second AP to send a physical protocol data unit (PHY protocol data unit, PPDU). The PPDU carries a frame corresponding to the type of the slave trigger frame. An interaction between the first AP and the second AP in the embodiments of this application may be completed by using the slave trigger frame, and the slave trigger frame in the embodiments of this application may carry the trigger type information and the AP indication information to indicate the type of the slave trigger frame and the second AP that sends the PPDU. In this way, information transmission between two or more APs is implemented, and a solution applicable to flexible scheduling of a slave AP in a unified frame format in a coordinated transmission scenario of a plurality of APs is provided. A master AP may flexibly schedule different types of transmission of a slave AP in a unified trigger frame format, thereby reducing complexity of signaling design. The slave AP may parse a trigger frame in a unified parsing manner, thereby reducing complexity of signaling parsing of the slave AP.

Figure 3:
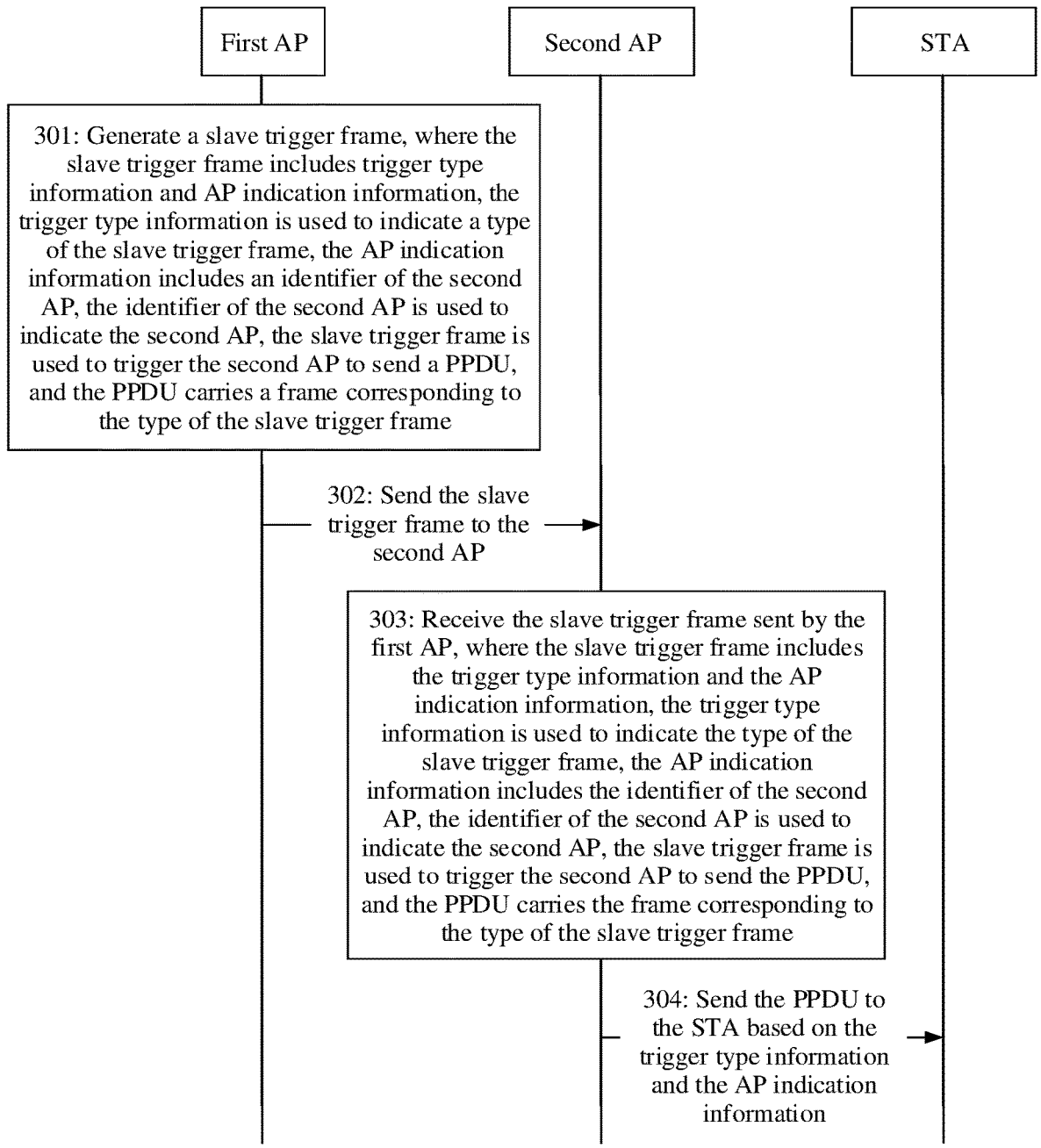
FIG. 3 is a schematic flowchart of an information transmission method and an information receiving method according to an embodiment of this application.

The following further describes the solutions in the embodiments of this application with reference to more accompanying drawings. In the embodiments of this application, FIG. 3 is a schematic flowchart of an information transmission method and an information receiving method according to an embodiment of this application. The method mainly includes the following steps.

301: A first AP generates a slave trigger frame, where the slave trigger frame includes trigger type information and AP indication information, the trigger type information is used to indicate a type of the slave trigger frame, the AP indication information includes an identifier of a second AP, the slave trigger frame is used to trigger the second AP to send a physical protocol data unit (PPDU), and the PPDU includes a frame corresponding to the type of the slave trigger frame.

FIG. 2 is used as an example. The first AP may be the master AP in FIG. 2, the second AP may be the slave AP 1, the slave AP 2, and the slave AP 3 in FIG. 2; and the first AP and the second AP may form D-MIMO. The slave trigger frame is used to trigger the second AP to send the physical protocol data unit (PPDU). The PPDU may be referred to as a physical layer data packet or a data packet. The PPDU includes the frame corresponding to the type of the slave trigger frame. The frame corresponding to the trigger type may be a MAC frame. "Corresponding to" refers to a trigger relationship between the slave trigger frame and a triggered frame. It may be understood that the slave trigger frame may be sent by any one of a plurality of APs. In this embodiment of this application, an example in which the first AP is the AP that sends the slave trigger frame is used for description. The first AP may be referred to as a master AP. Another AP, for example, a second AP, is referred to as a slave AP.

In this embodiment of this application, the slave trigger frame includes at least the following: the trigger type information and the AP indication information. The trigger type information is used to indicate the type of the slave trigger frame. Different slave trigger frames may correspond to different trigger types.

In some embodiments of this application, the type of the slave trigger frame includes a channel sounding subtype and a data transmission subtype. A slave trigger frame of the channel sounding subtype may be referred to as a channel sounding slave trigger frame, and the channel sounding slave trigger frame is used to trigger the second AP to send a PPDU or a MAC frame required in a channel sounding phase. A slave trigger frame of the data transmission subtype may be referred to as a data slave trigger frame, and the data slave trigger frame is used to trigger the second AP to send a PPDU or a MAC frame required in a data transmission phase.

Further, in some embodiments of this application, the channel sounding subtype includes at least one of the following: a slave trigger subtype of a null data packet announcement (null data packet announcement, NDPA), a slave trigger subtype of a null data packet (null data packet, NDP), or a slave trigger subtype of a beamforming report poll (beamforming report poll, BFRP); or the data transmission subtype includes at least one of the following: a slave trigger subtype of data (data) or a slave trigger subtype of a multi-user block acknowledgment request (multi-user block ACK request, MU-BAR).

A slave trigger frame with a subtype of the null data packet announcement may be referred to as an NDPA slave trigger frame (NDPA slave trigger frame), the NDPA slave trigger frame is used to trigger the second AP to send the NDPA, and an NDPA frame is a frame corresponding to the NDPA slave trigger frame. A slave trigger frame with a subtype of the null data packet may be referred to as an NDP slave trigger frame (NDP slave trigger frame), and the NDP slave trigger frame is used to trigger the second AP to send the NDP. A slave trigger frame with a subtype of the beamforming report poll may be referred to as a beamforming report poll slave trigger frame (BFRP trigger frame), and the beamforming report poll slave trigger frame is used to trigger the second AP to send the beamforming report poll. A slave trigger frame with a subtype of the data may be referred to as a data slave trigger frame (data slave trigger frame), and the data slave trigger frame is used to trigger the second AP to send downlink data. A slave trigger frame with a subtype of the multi-user block acknowledgment request may be referred to as a multi-user block acknowledgment request slave trigger frame (MU-BAR slave trigger frame), and the multi-user block acknowledgment request slave trigger frame is used to trigger the second AP to send the multi-user block acknowledgment request. It may be understood that the slave trigger frame may further include another type. For example, a slave trigger frame with a subtype of trigger may be referred to as a trigger slave trigger frame, and the trigger slave trigger frame is used to trigger the second AP to send a trigger frame to schedule a STA associated with the second AP to send uplink data.

For example, slave trigger frames may be classified into the following trigger types: an NDPA slave trigger frame, an NDP slave trigger frame, a BFRP slave trigger frame, a data slave trigger frame, and an MU-BAR slave trigger frame. In this case, an NDPA frame, an NDP frame, a BFRP frame, a data frame, and an MU-BAR frame are frames corresponding to the trigger types. It is not limited that the slave trigger frames of the one or more trigger types may further be configured based on an actual application scenario, or a slave trigger frame other than the foregoing types of slave trigger frames may be configured based on an actual application scenario.

In this embodiment of this application, the PPDU sent by the second AP has a plurality of implementations, for example, a channel sounding PPDU sent by the second AP under trigger of the first AP, where the channel sounding PPDU is a PPDU used for channel sounding (Sounding). For example, the channel sounding PPDU may be specifically a null data packet (null data packet, NDP). The NDP is a data packet that does not include data (Data). The NDP may be used for channel sounding.

302: The first AP sends the slave trigger frame to the second AP.

In this embodiment of this application, the first AP sends the slave trigger frame to the second AP, so that the second AP can receive the slave trigger frame sent by the first AP. The slave trigger frame may be transmitted between the first AP and the second AP in a wired transmission manner or a wireless transmission manner. A specific manner for sending the slave trigger frame by the first AP is not limited herein.

303: The second AP receives the slave trigger frame sent by the first AP, where the slave trigger frame includes the trigger type information and the AP indication information, the trigger type information is used to indicate the type of the slave trigger frame, the AP indication information includes the identifier of the second AP, the identifier of the second AP is used to indicate the second AP, the slave trigger frame is used to trigger the second AP to send the physical protocol data unit (PPDU), and the PPDU carries the frame corresponding to the type of the slave trigger frame.

In this embodiment of this application, the slave trigger frame may be transmitted between the first AP and the second AP in a wired transmission manner or a wireless transmission manner, and the second AP may receive the foregoing slave trigger frame from the first AP.

304: The second AP sends the PPDU to the STA based on the trigger type information and the AP indication information.

In this embodiment of this application, after receiving the slave trigger frame, the second AP parses the slave trigger frame, obtains identification information of the second AP from the slave trigger frame to obtain the type of the slave trigger frame, includes the corresponding frame in the PPDU based on the type of the slave trigger frame, and sends the PPDU to the STA.

In this embodiment of this application, the first AP serves as a master AP, and the second AP serves as a slave AP. The slave trigger frame sent by the first AP may be used to indicate the second AP to send the PPDU, and the PPDU carries the frame corresponding to the type of the slave trigger frame.

In this embodiment of this application, the second AP may send the PPDU to the STA based on the received slave trigger frame. In this embodiment of this application, the first AP directly schedules the second AP to send the PPDU, so that the second AP can send the PPDU according to an instruction of the first AP.

The slave trigger frame may include a plurality of fields and subfields. Subsequently, a frame structure of the slave trigger frame is described in detail.

In this embodiment of this application, to indicate one or more APs for sending the PPDU, the first AP includes identification information of the one or more APs in the slave trigger frame. For example, the first AP instructs the second AP to send the PPDU, and includes identification information of the second AP in the slave trigger frame.

The identification information of the second AP has a plurality of implementations. The identifier of the second AP is at least one of the following: a basic service set (basic service set, BSS) identifier (ID) corresponding to the second AP, a basic service set color (basic service set color, BSS Color) corresponding to the second AP, an association identifier (association identifier, AID) of the second AP, or a media access control (medium access control, MAC) address of the second AP.

The BSS ID corresponding to the second AP may include a group identifier (group ID) corresponding to the second AP. The identifier of the second AP may further include the group identifier corresponding to the second AP and a basic service set bitmap (BSS bitmap) corresponding to the second AP.

Specifically, a set including a plurality of APs may be referred to as one AP group. One second AP may be classified into at least one AP group, and a group identifier of the AP group to which the second AP belongs may be used as the identification information of the second AP. The AP group may be a D-MIMO group, and the group identifier corresponding to the second AP may be a distributed multiple-input multiple-output (distributed multiple-input multiple-output, D-MIMO) group identifier corresponding to the second AP. Each D-MIMO group includes a slave AP belonging to the D-MIMO group. Different group identifiers may be assigned to different slave APs, and the slave APs may be identified based on the group identifiers of the slave APs. For another example, because one basic service set usually includes one AP, a basic service set color of a basic service set to which the second AP belongs may be used as the identification information of the second AP. For another example, the group identifier and the basic service set bitmap that correspond to the second AP may be used as the identification information of the second AP. It is assumed that a preset quantity of slave APs exist in one D-MIMO group, and an order of the slave APs is known. In this case, whether a corresponding slave AP needs to participate in current channel sounding may be indicated based on that each bit in a bitmap corresponds to one slave AP, and the slave AP that needs to participate in the current channel sounding may be identified based on the group identifier and the bitmap that correspond to the slave AP. For another example, the AID of the second AP may be used as the identification information of the second AP, where the AID of the second AP may be pre-assigned by the first AP to the second AP; or the MAC address of the second AP is used as the identification information of the second AP. A specific implementation for the identification information of the second AP is not specifically limited in the embodiments of this application. In some embodiments of this application, optionally, to indicate one or more STAs to which the second AP sends the PPDU, the first AP includes identification information of the one or more STAs in the slave trigger frame.

It should be noted that the slave trigger frame generated by the first AP may be carried by using a plurality of types of information. For example, the slave trigger frame may be existing signaling used for interaction between the first AP and the second AP, or may be signaling newly defined by the first AP. A carrying manner and information content included in the slave trigger frame are described in detail in a subsequent embodiment.

In some embodiments of this application, the identification information of the STA includes at least one of the following: an AID of the STA or a MAC address of the STA.

The identification information of the STA has a plurality of implementations. For example, the AID of the STA may be used as the identification information of the STA, and the AID of the STA may be pre-assigned by an AP serving the STA to the STA; or the MAC address of the STA is used as the identification information of the STA. A specific implementation form used for the identification information of the STA is not specifically limited in the embodiments of this application.

Figure 4A:
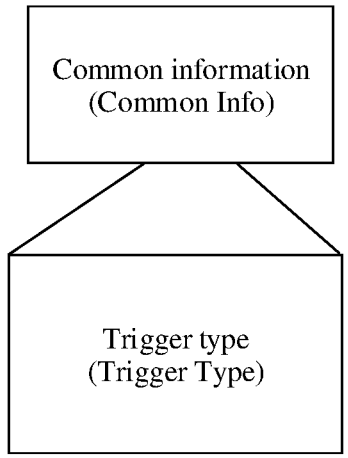
FIG. 4a is a schematic diagram of a composition structure of a slave trigger frame according to an embodiment of this application.
Figure 4B:
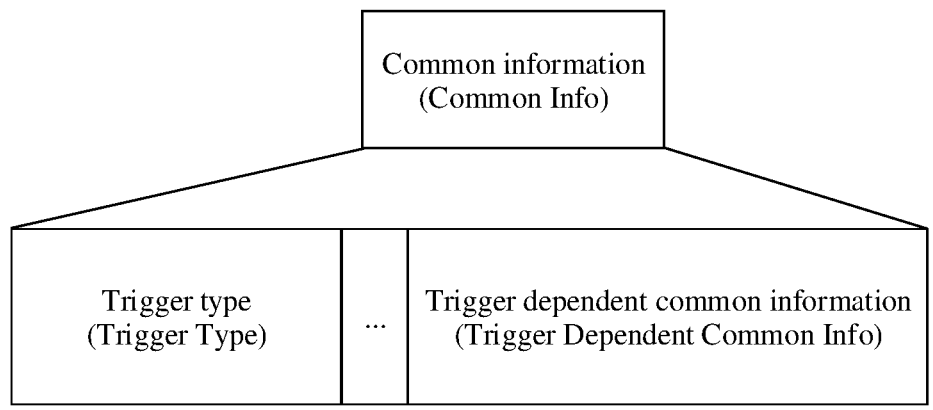
FIG. 4b is a schematic diagram of a composition structure of another slave trigger frame according to an embodiment of this application.
Figure 4C:
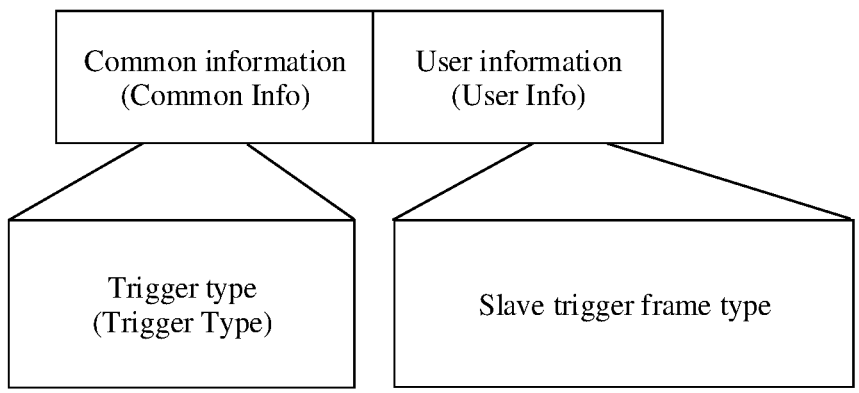
FIG. 4c is a schematic diagram of a composition structure of another slave trigger frame according to an embodiment of this application.

In some embodiments of this application, referring to FIG. 4a, the slave trigger frame includes a common information (Common Info) field, a trigger type (Trigger Type) subfield in the common information field carries trigger type information, and a plurality of values of the trigger type subfield are in a one-to-one correspondence with a plurality of trigger types of the slave trigger frame; or as shown in FIG. 4b, the slave trigger frame includes a common information field, a trigger type subfield in the common information field carries a first value, a trigger dependent common information (Trigger Dependent Common Info) subfield in the common information field carries trigger type information, and a plurality of values of a trigger dependent common information subfield are in a one-to-one correspondence with a plurality of trigger types of the slave trigger frame; or as shown in FIG. 4c, the slave trigger frame includes a common information field and a user information (User Info) field, a trigger type subfield in the common information field carries a first value, a slave trigger frame type (slave TF type) subfield in the user information field carries trigger type information, and a plurality of values of the slave trigger frame type subfield are in a one-to-one correspondence with a plurality of trigger types of the slave trigger frame.

First, FIG. 4a is used as an example for description. The common information field includes the trigger type (Trigger Type) field. The trigger type subfield carries the trigger type information and has a plurality of values, and each value of the trigger type subfield corresponds to one trigger type of slave trigger frame. For example, if there are three trigger types of slave trigger frames in total, the trigger type subfield may have at least three values, and each value of the trigger type subfield corresponds to one trigger type of slave trigger frame. For another example, a value 8 of the trigger type subfield represents a null data packet announcement slave trigger frame (NDPA slave trigger); a value 9 of the trigger type subfield represents a null data packet slave trigger frame (NDP slave trigger); a value 10 of the trigger type subfield represents a beamforming report poll slave trigger frame (BFRP slave trigger); a value 11 of the trigger type subfield represents a data slave trigger frame (data slave trigger); a value 12 of the trigger type subfield represents a multi-user block acknowledgment request slave trigger frame (MU-BAR slave trigger); and the value of the trigger type subfield may alternatively be any value of 13 to 15, and in this case, an indication function of the trigger type subfield is reserved for subsequent expansion. It may be understood that a trigger type corresponding to the value of the trigger type subfield may be changed.

FIG. 4b is used as an example for description. The common information field includes a trigger type subfield and a trigger dependent common information subfield. The trigger type subfield and a trigger association dependent common information field are used to jointly indicate the type of the slave trigger frame, that is, to jointly indicate the trigger type information. The trigger type subfield carries the first value, indicating that the trigger frame is a slave trigger frame. The first value may be any value of 8 to 15, for example, may be 8. Further, the trigger dependent common information subfield (Trigger Dependent Common Info) indicates a subtype of the slave trigger frame. The plurality of values of the trigger dependent common information subfield are in a one-to-one correspondence with the plurality of trigger types of the slave trigger frame.

For example, a value 0 of the trigger dependent common information subfield indicates that the trigger frame is a null data packet announcement slave trigger frame (NDPA slave trigger), a value 1 of the trigger dependent common information subfield indicates that the trigger frame is a null data packet slave trigger frame (NDP slave trigger), a value 2 of the trigger dependent common information subfield indicates that the trigger frame is a beamforming report poll slave trigger frame (BFRP slave trigger), a value 3 of the trigger dependent common information subfield indicates that the slave trigger frame is a data slave trigger frame (data slave trigger), a value 4 of the trigger dependent common information subfield indicates that the slave trigger frame is a multi-user block acknowledgment request slave trigger frame (MU-BAR slave trigger), and a value 5 of the trigger dependent common information subfield indicates reservation.

FIG. 4c is used as an example for description. The slave trigger frame includes the common information field and the user information (User Info) field, and the common information field includes the trigger type subfield. The trigger type subfield carries the first value, and the first value is used to indicate that the trigger frame is a slave trigger frame. For example, the first value may be 8. This is merely an example herein, and does not limit another value of the first value. When the trigger type subfield carries the first value, further, the user information field includes a slave trigger frame type (slave TF type) subfield. The slave trigger frame type (slave TF type) field carries the trigger type information. The plurality of values of the slave trigger frame type subfield are in a one-to-one correspondence with the plurality of trigger types of the slave trigger frame.

For example, a value 0 of the slave trigger frame type subfield includes a null data packet announcement slave trigger frame (NDPA slave trigger), a value 1 of the slave trigger frame type subfield represents a null data packet slave trigger frame (NDP slave trigger), a value 2 of the slave trigger frame type subfield represents a beamforming report poll slave trigger frame (BFRP slave trigger), a value 3 of the slave trigger frame type subfield represents a data slave trigger frame (data slave trigger), a value 4 of the slave trigger frame type subfield represents a multi-user block acknowledgment request slave trigger frame (MU-BAR slave trigger), and a value 5 of the slave trigger frame type subfield represents reservation.

Figure 5A:
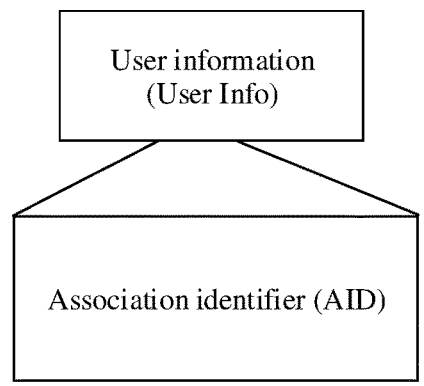
FIG. 5a is a schematic diagram of a composition structure of another slave trigger frame according to an embodiment of this application.

The foregoing describes the manner of carrying the trigger type information by using examples. The following describes a carrying manner for the AP indication information by using examples. As shown in FIG. 5a, the slave trigger frame includes a user information field, and an association identifier (association ID, AID) field in the user information field carries the AP indication information; or
   as shown in FIG. 5b, the slave trigger frame includes a user information field, an association identifier subfield in the user information field is a special AID, and a trigger dependent user information subfield in the user information field carries the AP indication information.

First, FIG. 5a is used as an example for description. The user information field includes the association identifier (association ID, AID) field, and the association identifier subfield carries the AP indication information. The association identifier subfield may directly carry the identifier of the second AP. For example, the association identifier subfield may carry a negotiated slave AP AID.

Figure 5B:
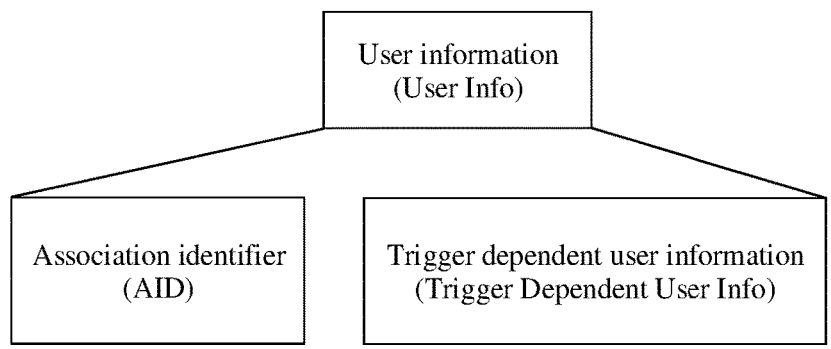
FIG. 5b is a schematic diagram of a composition structure of another slave trigger frame according to an embodiment of this application.

FIG. 5b is used as an example for description. The slave trigger frame includes the user information field, and the user information field includes the association identifier subfield and the trigger dependent user information subfield. A value of the association identifier subfield is a special AID. The special AID may be an AID value that is not used or defined, for example, 4094, 4095, or another preset value. This is not limited herein. When the value of the association identifier subfield is a special AID, the second AP may further parse the trigger dependent user information subfield in the user information field, to obtain the AP indication information from the trigger dependent user information subfield.

It should be noted that several implementations of the trigger type information may be flexibly combined with the AP indication information.

In some embodiments of this application, if a plurality of data frames need to be exchanged between the first AP and the second AP, to indicate, to the second AP, a data frame that is being exchanged, the first AP may include a transmission identifier (transmission ID) field in the slave trigger frame to indicate a data frame triggered by the data slave trigger frame, to be specific, the first AP triggers a data frame carried by the PPDU sent by the second AP. The transmission identifier field included in the data slave trigger frame is used to indicate a data frame that needs to be exchanged by the first AP. In this way, a problem that a to-be-exchanged data frame cannot be determined when a plurality of data frames need to be exchanged between the first AP and the second AP is resolved.

Figure 6:
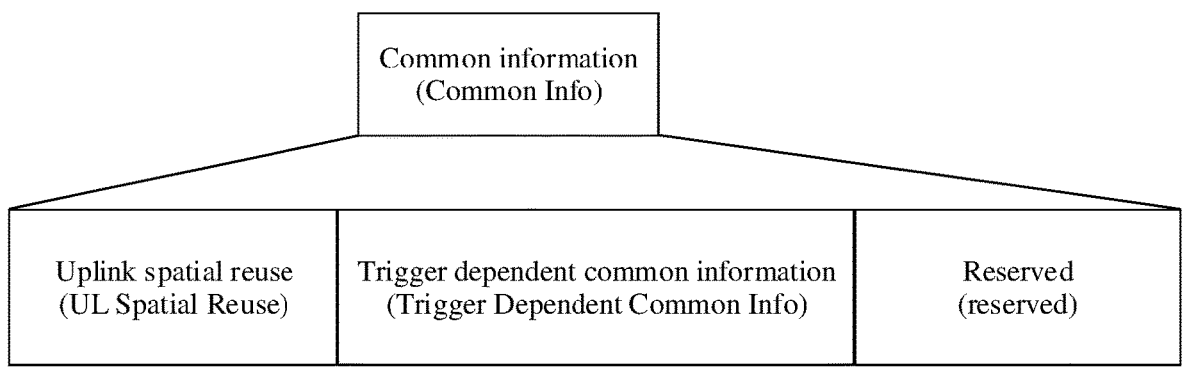
FIG. 6 is a schematic diagram of a composition structure of another slave trigger frame according to an embodiment of this application.

Further, in some embodiments of this application, FIG. 6 is a schematic diagram of a composition structure of a data slave trigger frame according to an embodiment of this application. The data slave trigger frame includes a common information field. The common information field includes at least one of the following: a trigger dependent common information (Trigger Dependent Common Info) subfield, an uplink spatial reuse (UL Spatial Reuse) subfield, or a reserved (reserved) subfield.

The trigger dependent common information subfield includes a transmission identifier field;
   the uplink spatial reuse subfield includes a transmission identifier field; or
   the reserved subfield includes a transmission identifier field.

Therefore, the transmission identifier field may be carried by using any one of the trigger dependent common information subfield, the uplink spatial reuse subfield, or the reserved subfield. A specific manner for carrying the transmission identifier field may be determined based on an application scenario. For example, if a master AP may exchange a plurality of data frames with a slave AP, a data frame to be transmitted in current coordination may be indicated in a slave trigger frame. Therefore, a transmission ID needs to be introduced into the slave trigger frame to identify a data frame that needs to be transmitted in coordination. The transmission ID may be carried in the trigger dependent common info subfield. The transmission ID may alternatively be carried in another field, for example, a UL spatial reuse subfield in common info. Because a frame after the slave trigger frame is a downlink frame, a UL spatial reuse subfield in the downlink frame may be used to carry the transmission ID. The transmission ID may alternatively be carried in the reserved (reserved) subfield in the common info field.

In some embodiments of this application, to indicate, to the second AP, a PPDU type configured for the first AP, the first AP may include a multi-user (multi-user, MU) PPDU type field in a data frame. In this case, the slave trigger frame is a data slave trigger frame, and the data slave trigger frame triggers the data frame, to be specific, the first AP triggers the data frame carried by the PPDU sent by the second AP. The MU PPDU type field is used to indicate a type of the data frame.

Specifically, the type of the data frame may include an intra-basic service set (intra-BSS) MU PPDU and an inter-basic service set (inter-BSS) MU PPDU. The intra-basic service set (intra-BSS) MU PPDU is an MU PPDU in a BSS, and the inter-basic service set (inter-BSS) MU PPDU is an MU PPDU in two or more BSSs.

Different types of the data frame may be indicated by using different values of the MU PPDU type field. In some embodiments of this application, the MU PPDU type field is a second value, indicating that the data frame is the intra-basic service set MU PPDU; or the MU PPDU type field is a third value, indicating that the data frame is the inter-basic service set MU PPDU.

For example, a MU PPDU type field is set in the data frame. When the field is set to the second value (for example, 0), it indicates that a current PPDU is an intra-BSS MU PPDU. When the field is set to the third value (for example, 1), it indicates that a current PPDU is an inter-BSS MU PPDU.

In some embodiments of this application, the slave trigger frame further includes a transmission parameter information, and the transmission parameter information is used to indicate a transmission parameter of the PPDU. The slave trigger frame includes a common information field, and a trigger dependent common information subfield in the common information field carries the transmission parameter information.

The first AP may indicate, by using the slave trigger frame, the transmission parameter of the PPDU sent by the second AP, and the transmission parameter of the PPDU may include physical layer-related information and MAC layer-related information. For example, different slave trigger frames need to carry different scheduling signaling. The common information field includes the trigger dependent common information subfield, and the trigger dependent common information subfield may be used to carry the transmission parameter information, so that the first AP can indicate the transmission parameter of the PPDU sent by the second AP.

In the embodiments of this application, the first access point (AP) sends the slave trigger frame. The slave trigger frame includes the trigger type information and the AP indication information. The trigger type information is used to indicate the type of the slave trigger frame. The AP indication information includes the identifier of the second AP. The identifier of the second AP is used to indicate the second AP. The slave trigger frame is used to trigger the second AP to send the physical protocol data unit (PHY protocol data unit, PPDU). The PPDU carries the frame corresponding to the type of the slave trigger frame. An interaction between the first AP and the second AP in the embodiments of this application may be completed by using the slave trigger frame, and the slave trigger frame in the embodiments of this application may carry the trigger type information and the AP indication information to indicate the type of the slave trigger frame and the second AP that sends the PPDU. In this way, information transmission between two or more APs is implemented, and a solution applicable to flexible scheduling of a slave AP in a unified frame format in a coordinated transmission scenario of a plurality of APs is provided. A master AP may flexibly schedule different types of transmission of a slave AP in a unified trigger frame format, thereby reducing complexity of signaling design. The slave AP may parse a trigger frame in a unified parsing manner, thereby reducing complexity of signaling parsing of the slave AP.

Figure 7A:
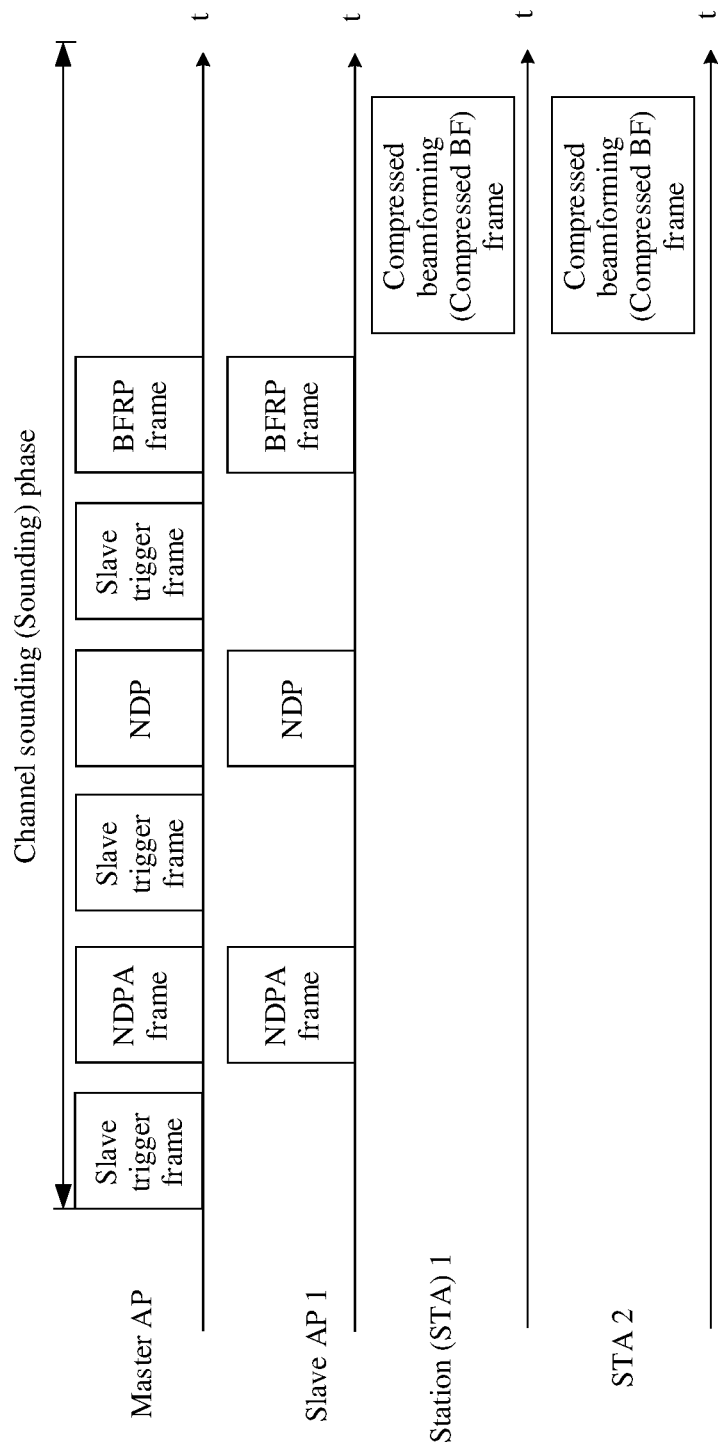
FIG. 7a is a schematic diagram of a channel sounding procedure in a D-MIMO scenario according to an embodiment of this application.
Figure 7B:
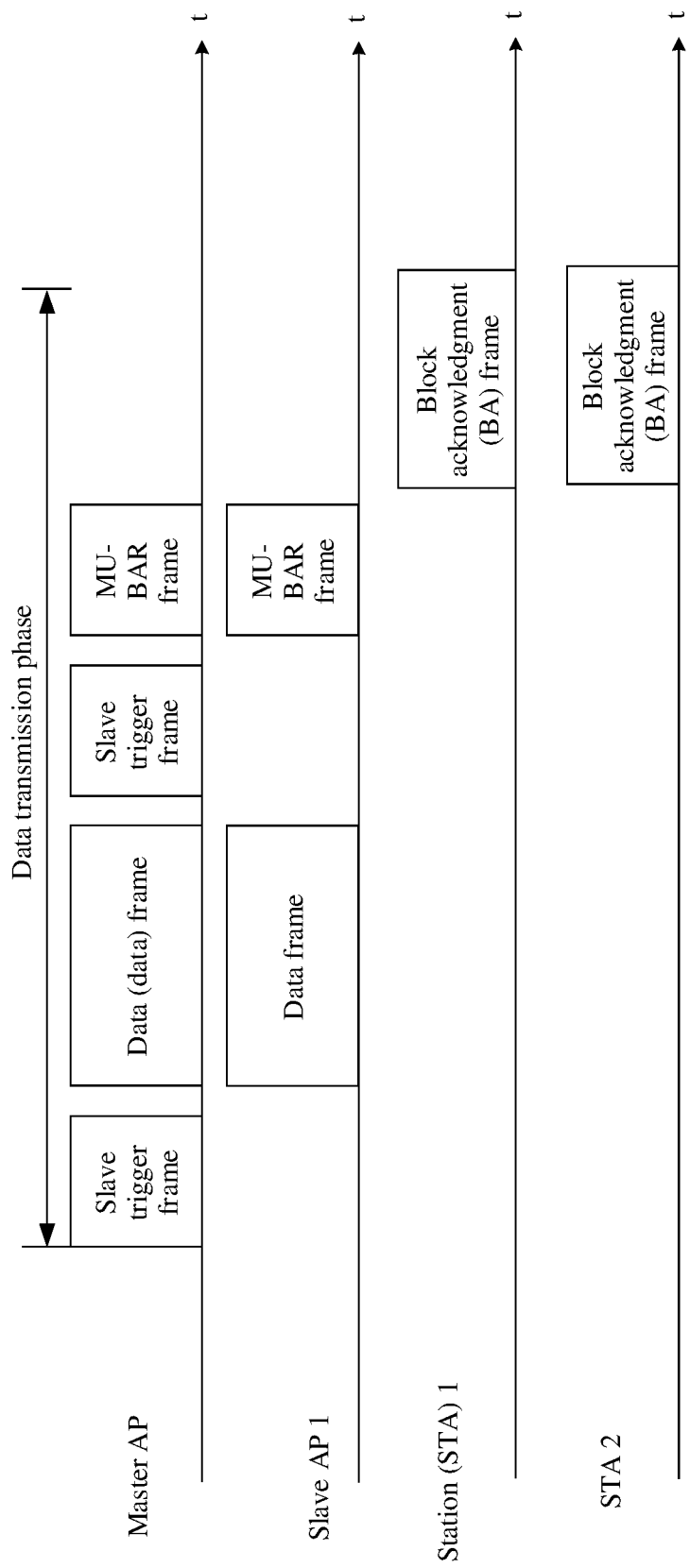
FIG. 7b is a schematic diagram of a data transmission procedure in a D-MIMO scenario according to an embodiment of this application.

The information transmission method and the information receiving method that are provided in the embodiments of this application are further described below by using examples. An example in which a first AP is a master (master) AP and a second AP is one slave (slave) AP is used for description. The first AP may communicate with one slave AP and two STAs. FIG. 7a and FIG. 7b are schematic diagrams of D-MIMO procedures according embodiments of this application. The master AP may directly schedule the second AP to send a PPDU.

For a channel sounding (Sounding) phase, referring to FIG. 7a, the procedure may include the following steps.

Step S01: The master AP sends a slave trigger frame (slave TF) to the slave AP, requiring the slave AP receiving the slave TF to send an NDPA frame. Trigger type information in the slave TF in step S01 indicates that the slave TF is an NDPA slave TF which is used to trigger the slave AP to send the NDPA frame.

Step S02: After receiving the slave TF, the slave AP sends the NDPA frame after a period of time, for example, after short inter-frame space (short inter-frame space, SIFS). Optionally, the master AP may also send an NDPA frame after a period of time. The NDPA frame is used to notify a corresponding STA to prepare for channel sounding.

Step S03: The master AP sends a slave TF to the slave AP after a period of time (for example, SIFS), requiring the slave AP to send an NDP. Trigger type information in the slave TF in step S03 indicates that the slave TF is an NDP slave TF frame which is used to trigger the slave AP to send the NDP for channel sounding.

Step S04: After receiving the slave TF, the slave AP sends the NDP after a period of time (for example, SIFS), where the NDP is used for channel sounding. Optionally, the master AP may further send an NDP together with the slave AP.

Step S05: The master AP sends a slave TF to the slave AP after a period of time (for example, SIFS), requiring the slave AP to send a BFRP frame. Trigger type information in the slave TF in step S05 indicates that the slave TF is a BFRP slave TF frame which is used to trigger the slave AP to send the BFRP frame.

It may be understood that in the embodiments of this application, step S01, step S03, and step S05 are not limited to each slave trigger frame needing to be in the slave trigger frame format provided. For example, in the embodiments of this application only at least one of the NDPA slave TF, the NDP slave TF, and the BFRP slave TF needs to be in the slave trigger frame format provided.

Step S06: After receiving the slave TF, the slave AP sends the BFRP frame together with the master A after a period of time (for example, SIFS), where the frame is used to require the STA to feed back a channel sounding report.

Step S07: After receiving the BFRP frame, the STA sends a compressed BF frame (compressed BF) on a corresponding resource after a period of time (for example, SIFS).

For the data transmission phase, referring to FIG. 7b, the procedure mainly includes the following steps.

Step S11: The master AP sends a slave TF to the slave AP, requiring the slave AP to send a data frame. Trigger type information in the slave TF in step S11 indicates that the slave TF is a data slave TF frame which is used to trigger the slave AP to send the data frame.

Step S12: After receiving the slave TF, the slave AP sends the data frame to one or more STAs after a period of time (for example, SIFS). Optionally, the master AP may also send a data frame to one or more STAs.

Step S13: The master AP sends a slave TF to the slave AP after a period of time (for example, SIFS), requiring the slave AP to send an MU-BAR frame together with the data frame. Trigger type information in the slave TF in step S13 indicates that the slave TF is an MU-BAR slave TF frame which is used to trigger the slave AP to send the MU-BAR frame.

Step S14: After receiving the slave TF, the slave AP sends the MU-BAR frame after a period of time (for example, SIFS), where the MU-BAR frame is used to trigger a related STA to return a block acknowledgment (block ACK, BA) frame. Optionally, the master AP may also send an MU-BAR frame.

Step S15: After receiving the MU-BAR frame, the STA sends a BA frame on a corresponding resource after a period of time (for example, SIFS).

It may be understood that in the embodiments of this application step S11 and step S13 are not limited to each slave trigger frame needing to be in the slave trigger frame format provided. For example, in the embodiments of this application only at least one of the data slave TF and the MU-BAR slave TF needs to be in the slave trigger frame format provided.

In the embodiments of this application, a master AP may flexibly schedule different types of transmission of a slave AP in a unified trigger frame format, thereby reducing complexity of signaling design. The slave AP may parse a trigger frame in a unified parsing manner, thereby reducing complexity of signaling parsing of the slave AP.

In the embodiments of this application, a slave trigger frame in a D-MIMO scenario in a WLAN may be configured, and a PPDU further needs to be configured. First, in the embodiments of this application, a frame structure is designed in detail for the slave TF in the D-MIMO scenario in the WLAN. Second, a structure is further designed for the PPDU in the D-MIMO scenario in the WLAN. The embodiments of this application may be applicable to a scenario of a strong interaction between a plurality of APs, or applicable to a scenario of a weak interaction between a plurality of APs.

In the scenario of a strong interaction between a plurality of APs, a master AP and a slave AP have negotiated, by using a communications network, data for D-MIMO coordinated transmission. A network element in a wireless communications system has negotiated a signaling setting and scheduling information that are required for D-MIMO coordinated data transmission. There are two cases in the scenario of a strong interaction between a plurality of APs: Only one piece of collaboration data can be negotiated at a time, and a plurality of pieces of collaboration data can be negotiated at a time.

For the scenario of a weak interaction between a plurality of APs, a network element in a wireless communications system has negotiated data for D-MIMO coordinated transmission, but has not negotiated a signaling setting and scheduling information that are required for coordinated data transmission. There are also two cases in the scenario of a weak interaction between a plurality of APs: Only one piece of collaboration data can be negotiated at a time, and a plurality of pieces of collaboration data can be negotiated at a time.

In this embodiment, the following two pieces of key information need to be in the slave trigger frame: a slave trigger type and indication information of a slave AP. For ease of description, in a slave TF composition structure, a common information field is abbreviated as common information, and a user information field is abbreviated as user information. Meanings of uppercase and lowercase in field names are the same. For example, Trigger Type and trigger type have a same meaning. A similar abbreviation manner is also used for other fields in the slave TF composition structure, and the other fields are not described one by one.

The two pieces of information each have several indication manners, which are described one by one in the following.

Slave Trigger Type Indication Manner 1:
Definitions of trigger type subfields are shown in Table 1:

| Trigger type subfield value | Trigger type |
| --- | --- |
| 0 | Basic (Basic) |
| 1 | Beamforming report poll (beamforming report poll, BFRP) |
| 2 | Multi-user block acknowledgment request (multi-user block ACK request, MU-BAR) |
| 3 | Multi-user request to send (multi-user request to send, MU-RTS) |
| 4 | Buffer status report poll (buffer status report poll, BSRP) |
| 5 | Group cast with retries multi-user block acknowledgment request (group cast with retries multi-user block ACK request, GCR MU-BAR) |
| 6 | Bandwidth query report poll (bandwidth query report poll, BQRP) |
| 7 | Null data packet feedback report poll (null data packet feedback report poll, NDP NFRP) |
| 8-15 | Reserved (reserved) |

In this implementation, some reserved trigger type subfields are used to indicate a plurality of types of slave TFs. Slave TF types include some or all of the following types: NDPA slave trigger, NDP slave trigger, BFRP slave trigger, data slave trigger, and MU-BAR slave trigger. For example, a value 8 represents the NDPA slave trigger, which is used to trigger an NDPA frame; a value 9 represents the NDP slave trigger, which is used to trigger an NDP; a value 10 represents the BFRP slave trigger, which is used to trigger a BFRP frame; a value 11 represents the data slave trigger, which is used to trigger a data frame; and a value 12 represents the MU-BAR slave trigger, which is used to trigger an MU-BAR frame. It should be noted that a trigger frame represented by a specific value is not strictly required, provided that values are in a one-to-one correspondence with a plurality of types of trigger frames.

Slave Trigger Type Indication Manner 2:
In this implementation, a reserved trigger type subfield is used to indicate a slave TF, and further, indicate a subtype of the slave TF in a trigger dependent common info subfield. Slave TF types include some or all of the following types: NDPA slave trigger, NDP slave trigger, BFRP slave trigger, data slave trigger, and MU-BAR slave trigger.

Slave Trigger Type Indication Manner 3:
In a user info field, a special AID 12 is used to indicate that the user info carries a subtype of a slave TF. Slave TF types include some or all of the following types: NDPA slave trigger, NDP slave trigger, BFRP slave trigger, data slave trigger, and MU-BAR slave trigger. Optionally, the first or the last user info field is used to indicate the subtype of the slave TF. When the last user info field is used, AID 12=4095 may be used.

The three slave trigger type indication manners are described in the foregoing embodiment, and two slave AP indication manners are described below.

Slave AP Indication Manner 1:
In a user info field, an AID 12 subfield is used to indicate a slave AP. The AID is pre-assigned by a master AP to the slave AP, and is not assigned to a station associated with the master AP. The master AP assigns different AIDs to different slave APs for identification, so that the master AP can schedule a plurality of slave APs in one slave TF by using the user info field.

Slave AP Indication Manner 2:
In a user info field, a special AID 12 subfield is used to indicate that the user info field is used to carry indication information of a slave AP. The indication information of the slave AP is carried in a trigger dependent user info subfield. In this implementation, only a special AID 12 value needs to be defined. When an AID 12 subfield in a user info field is set to the value, it indicates that a trigger dependent user info subfield in the user info field carries the indication information of the slave AP. The indication information of the slave AP may be an identifier assigned by the master AP, or may be a MAC address, a BSSID, or a BSS color of the slave AP. In this implementation, a plurality of user info fields may be used to respectively carry indication information of a plurality of slave APs.

The special AID 12 may be an AID value that is not to be assigned to a STA. The special AID 12 may alternatively be equal to 4095. In a current standard, 4095 is used to indicate a start of a supplementation field. After 4095 is used to indicate that indication information of the slave AP is carried, a legacy (legacy) user no longer parses a slave trigger frame or uses 4095 as the start of the supplementation field. For a slave AP, the slave AP first learns, by using a trigger type, that the frame is a slave TF, and further learns of the slave trigger indication information according to an indication that the AID value is 4095.

Figure 8A:
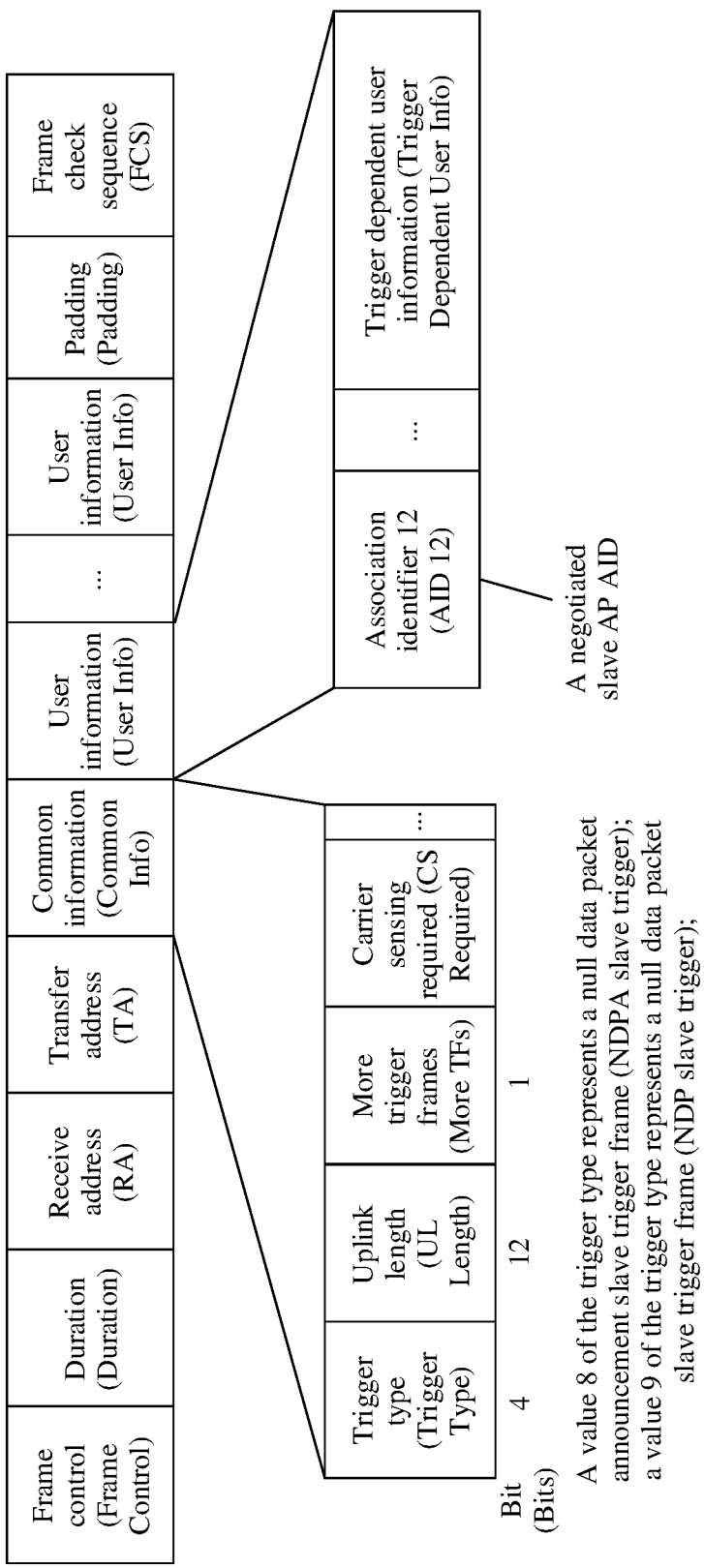
FIG. 8a is a schematic diagram of a composition structure of another slave trigger frame according to an embodiment of this application.
Figure 8B:
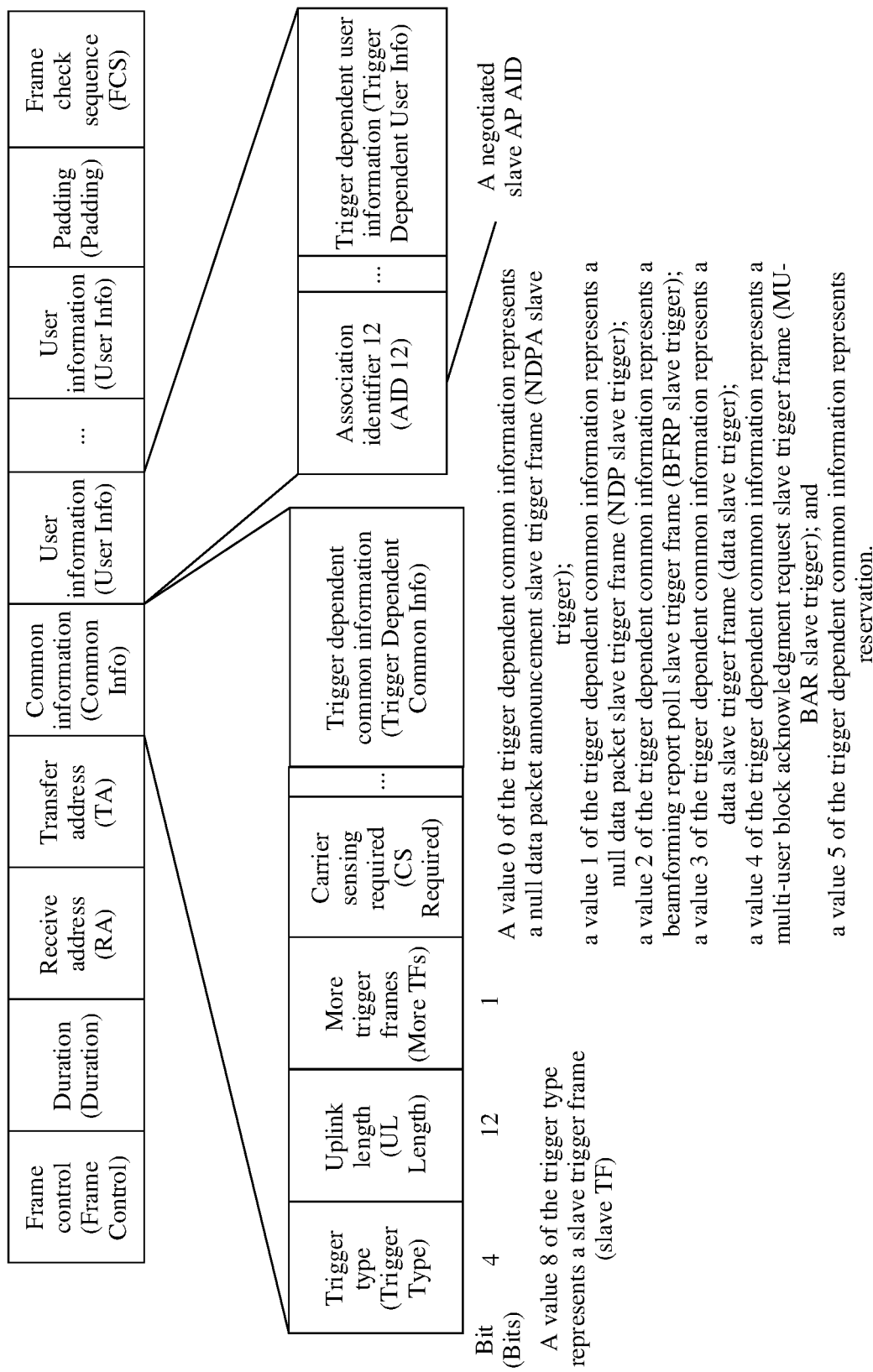
FIG. 8b is a schematic diagram of a composition structure of another slave trigger frame according to an embodiment of this application.
Figure 8C:
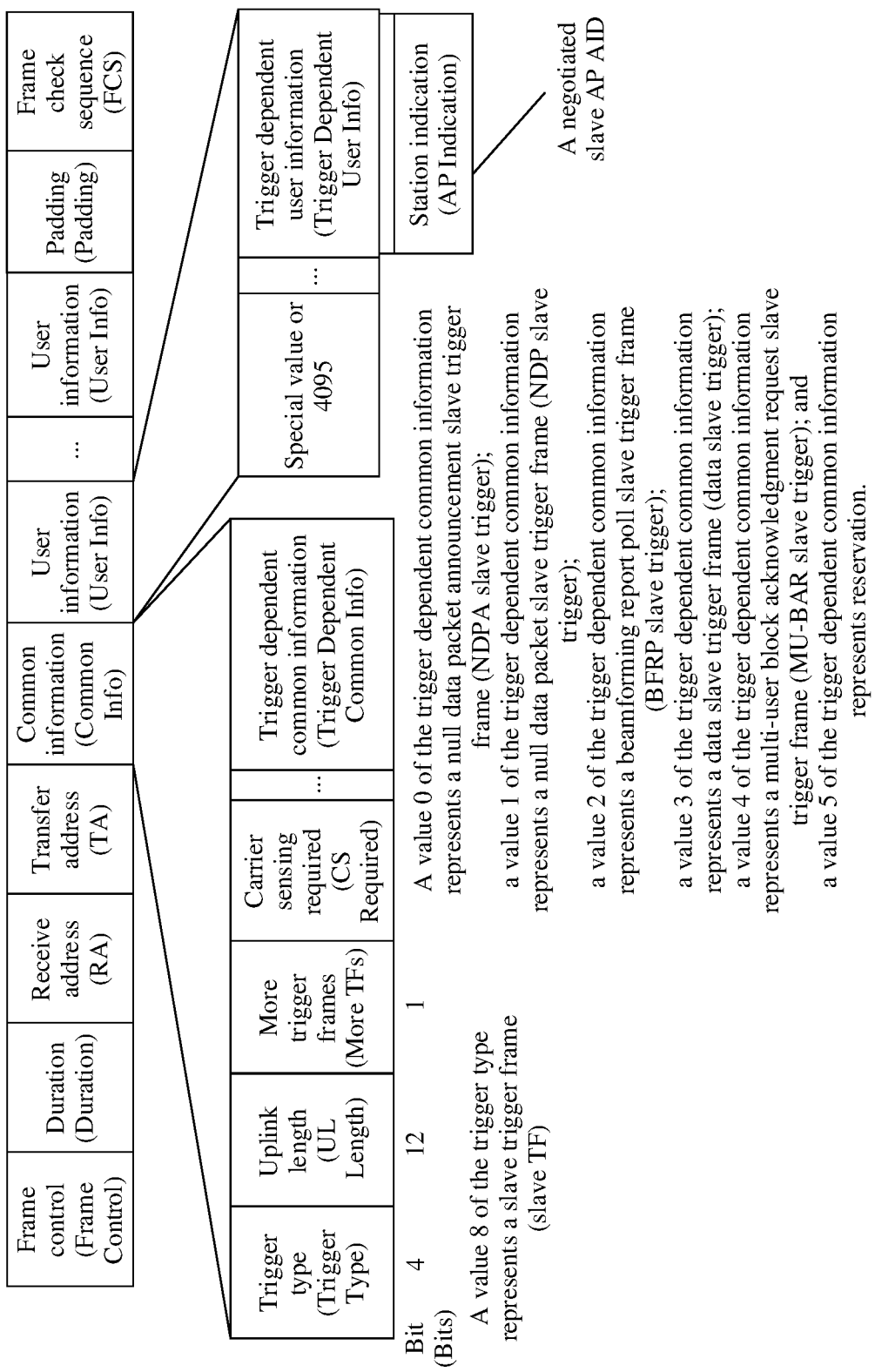
FIG. 8c is a schematic diagram of a composition structure of another slave trigger frame according to an embodiment of this application.
Figure 8D:
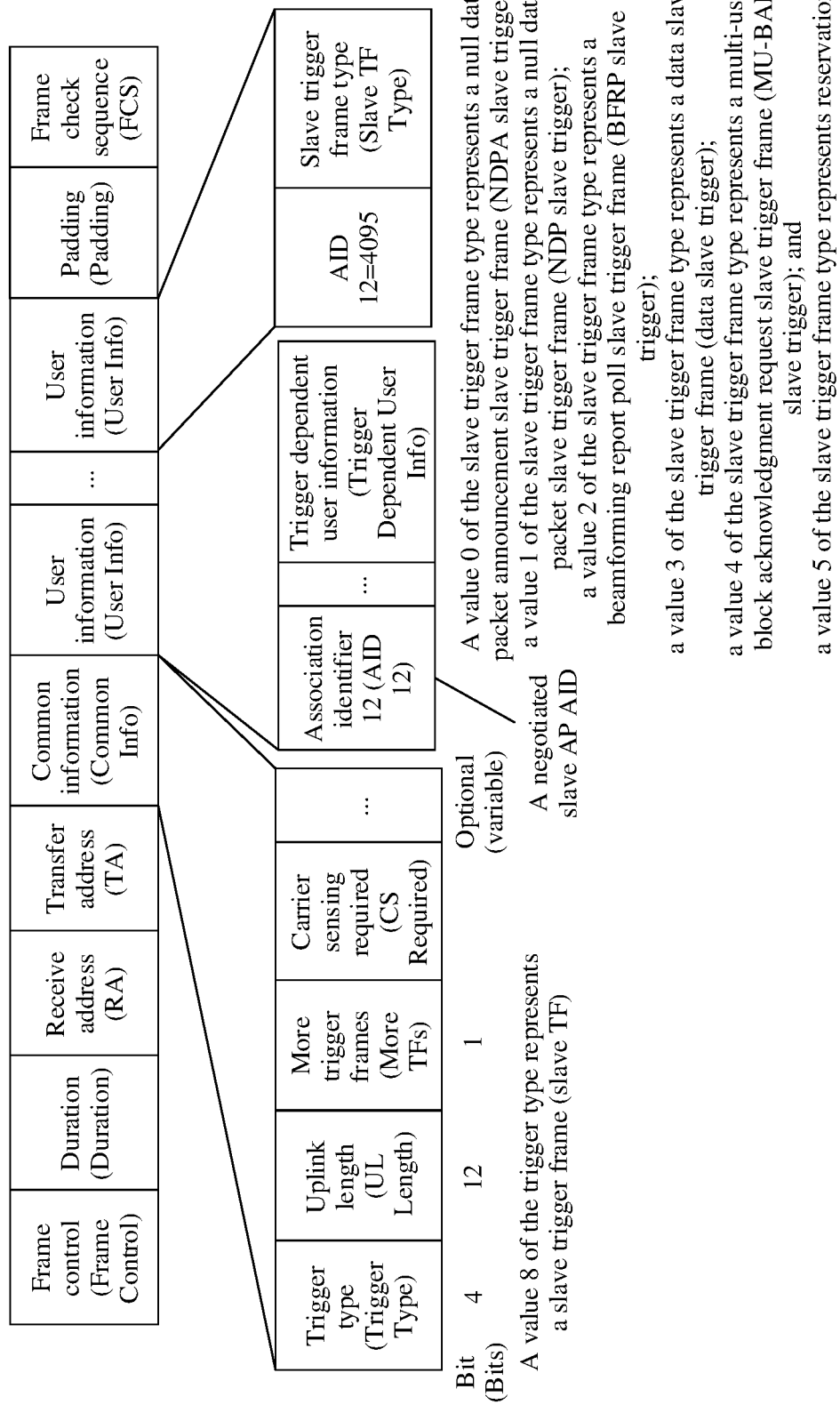
FIG. 8d is a schematic diagram of a composition structure of another slave trigger frame according to an embodiment of this application.

In the embodiments of this application, a plurality of slave TF type indication manners and a plurality of slave AP indication manners may be used in combination. For example, FIG. 8*a* shows a combination of the slave trigger type indication manner 1 and the slave AP indication manner 1. FIG. 8*b* shows a combination of the slave trigger type indication manner 2 and the slave AP indication manner 1. FIG. 8*c* shows a combination of the slave trigger type indication manner 2 and the slave AP indication manner 2. FIG. 8*d* is a combination of the slave trigger type indication manner 3 and the slave AP indication manner 1. For ease of description, in a slave TF composition structure, a common information field is abbreviated as common information, and a user information field is abbreviated as user information. A similar abbreviation manner is also used for other fields in the slave TF composition structure, and the other fields are not described one by one.

As shown in FIG. 8*a*, a frame structure of a slave TF mainly includes the following composition structures: frame control (Frame Control), duration (Duration), a receive address (receive address, RA), a transfer address (transfer address, TA), common information (Common Info), a plurality of pieces of user information (User Info), padding (Padding), and a frame check sequence (frame check sequence, FCS).

The common information may include: a trigger type (Trigger Type), an uplink length (UL Length), more trigger frames (More TFs), and carrier sensing required (CS Required).

The trigger type occupies 4 bits. A value of the trigger type ranges from 8 to 15. A value 8 of the trigger type represents a null data packet announcement slave trigger frame (NDPA slave trigger), a value 9 of the trigger type represents a null data packet slave trigger frame (NDP slave trigger), a value 10 of the trigger type represents a beamforming report poll slave trigger frame (BFRP slave trigger), a value 11 of the trigger type represents a data slave trigger frame (data slave trigger), a value 12 of the trigger type represents a multi-user block acknowledgment request slave trigger frame (MU-BAR slave trigger), and values 13 to 15 of the trigger type represent reservation. The uplink length occupies 12 bits. The more trigger frames occupy 1 bit. The carrier sensing required occupies 1 bit.

The user information may include an association identifier 12 (AID 12) and trigger dependent user information (Trigger Dependent User Info). The AID 12 may carry a negotiated slave AP AID.

As shown in FIG. 8*b*, a frame structure of another slave TF mainly includes the following composition structures: frame control (Frame Control), duration (Duration), a receive address (receive address, RA), a transfer address (transfer address, TA), common information (Common Info), a plurality of pieces of user information (User Info), padding (Padding), and a frame check sequence (frame check sequence, FCS).

The common information may include: a trigger type (Trigger Type), an uplink length (UL Length), more trigger frames (More TFs), carrier sensing required (CS Required), and trigger dependent common information (Trigger Dependent Common Info).

The trigger type occupies 4 bits. A value of the trigger type ranges from 8 to 15. A value 8 of the trigger type represents a slave trigger frame (slave TF). The uplink length occupies 12 bits. The more trigger frames occupy 1 bit. The carrier sensing required occupies 1 bit.

In an embodiment of this application, a value 0 of the trigger dependent common information represents a null data packet announcement slave trigger frame (NDPA slave trigger), a value 1 of the trigger dependent common information represents a null data packet slave trigger frame (NDP slave trigger), a value 2 of the trigger dependent common information represents a beamforming report poll slave trigger frame (BFRP slave trigger), a value 3 of the trigger dependent common information represents a data slave trigger frame (data slave trigger), a value 4 of the trigger dependent common information represents a multi-user block acknowledgment request slave trigger frame (MU-BAR slave trigger), and a value 5 of the trigger dependent common information represents reservation.

The user information may include an association identifier 12 (AID 12) and trigger dependent user information (Trigger Dependent User Info). The AID 12 may carry a negotiated slave AP AID.

As shown in FIG. 8*c*, a frame structure of another slave TF mainly includes the following composition structures: frame control (Frame Control), duration (Duration), a receive address (receive address, RA), a transfer address (transfer address, TA), common information (Common Info), a plurality of pieces of user information (User Info), padding (Padding), and a frame check sequence (frame check sequence, FCS).

The common information may include: a trigger type (Trigger Type), an uplink length (UL Length), more trigger frames (More TFs), carrier sensing required (CS Required), and trigger dependent common information (Trigger Dependent Common Info).

The trigger type occupies a plurality of bits, for example, 4 bits. A value of the trigger type ranges from 8 to 15. A value 8 of the trigger type represents a slave trigger frame (slave TF). The uplink length occupies 12 bits. The more trigger frames occupy 1 bit. The carrier sensing required occupies 1 bit.

A value 0 of the trigger dependent common information represents a null data packet announcement slave trigger frame (NDPA slave trigger), a value 1 of the trigger dependent common information represents a null data packet slave trigger frame (NDP slave trigger), a value 2 of the trigger dependent common information represents a beamforming report poll slave trigger frame (BFRP slave trigger), a value 3 of the trigger dependent common information represents a data slave trigger frame (data slave trigger), a value 4 of the trigger dependent common information represents a multi-user block acknowledgment request slave trigger frame (MU-BAR slave trigger), and a value 5 of the trigger dependent common information represents reservation.

The user information may include a special value or 4095 and trigger dependent user information (Trigger Dependent User Info). The trigger dependent user information (Trigger Dependent User Info) carries a station indication (AP Indication). The station indication (AP Indication) may carry a negotiated slave AP AID.

As shown in FIG. 8d, a frame structure of another slave TF mainly includes the following composition structures: frame control (Frame Control), duration (Duration), a receive address (receive address, RA), a transfer address (transfer address, TA), common information (Common Info), a plurality of pieces of user information (User Info), padding (Padding), and a frame check sequence (frame check sequence, FCS).

The common information may include: a trigger type (Trigger Type), an uplink length (UL Length), more trigger frames (More TFs), and carrier sensing required (CS Required).

The trigger type occupies 4 bits. A value of the trigger type ranges from 8 to 15. A value 8 of the trigger type represents a slave trigger frame (slave TF). The uplink length occupies 12 bits. The more trigger frames occupy 1 bit. The carrier sensing required occupies 1 bit.

One piece of user information in the slave trigger frame may include an association identifier 12 (AID 12) and trigger dependent user information (Trigger Dependent User Info). The AID 12 may carry a negotiated slave AP AID.

Another piece of user information in the slave trigger frame may include an association identifier 12 (AID 12) and a slave trigger frame type (Slave TF Type). A value of the AID 12 is 4095. A value 0 of the slave trigger frame type represents a null data packet announcement slave trigger frame (NDPA slave trigger), a value 1 of the slave trigger frame type represents a null data packet slave trigger frame (NDP slave trigger), a value 2 of the slave trigger frame type represents a beamforming report poll slave trigger frame (BFRP slave trigger), a value 3 of the slave trigger frame type represents a data slave trigger frame (data slave trigger), a value 4 of the slave trigger frame type represents a multi-user block acknowledgment request slave trigger frame (MU-BAR slave trigger), and a value 5 of the slave trigger frame type represents reservation.

It should be noted that the enumerated values of the trigger type information and the corresponding trigger frame types are merely examples, and correspondences between the values and the trigger frame types may be changed. This is not specifically limited in the embodiments of this application.

Figure 8E:
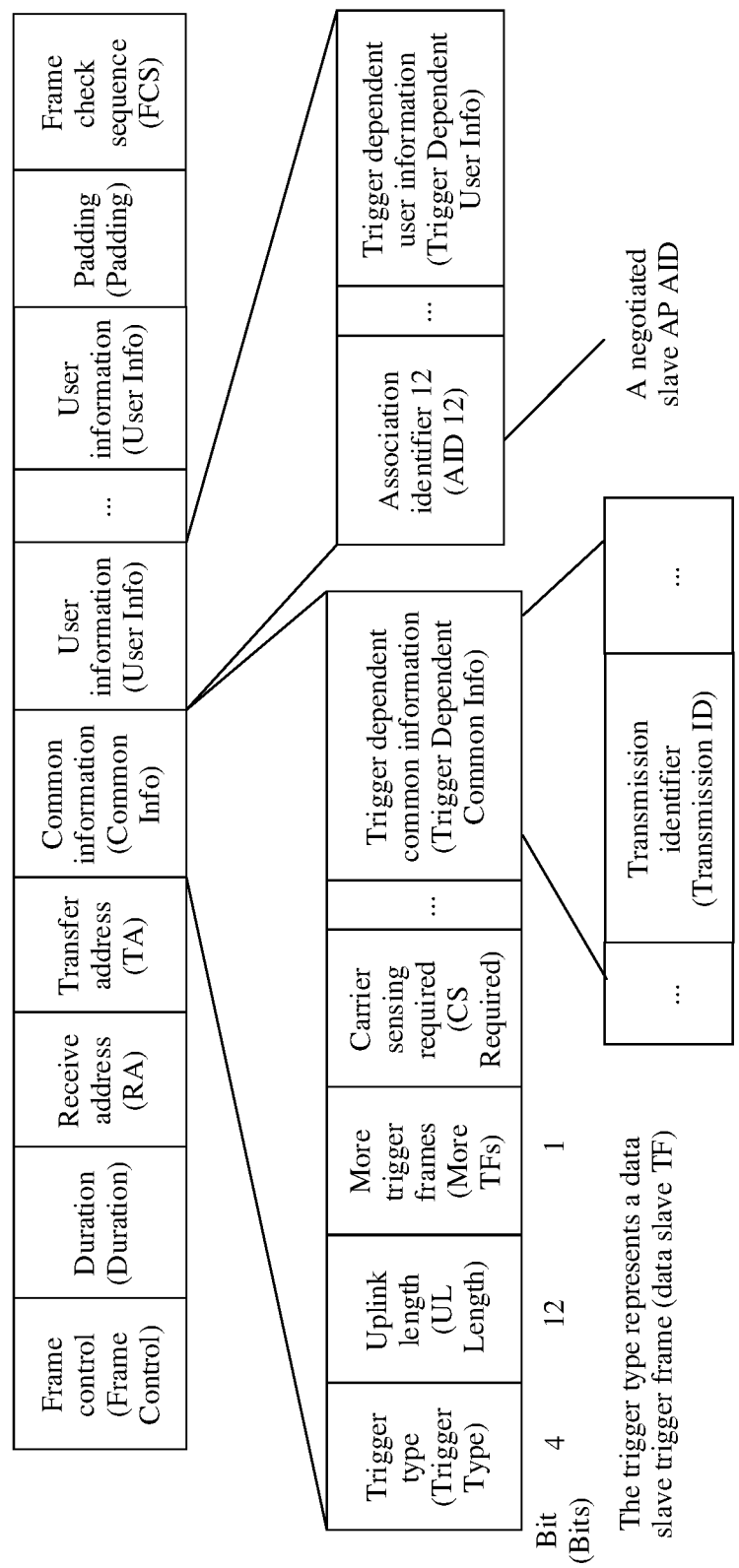
FIG. 8e is a schematic diagram of a composition structure of another slave trigger frame according to an embodiment of this application.

In some embodiments of this application, as shown in FIG. 8e, a frame structure of another slave TF mainly includes the following composition structures: frame control (Frame Control), duration (Duration), a receive address (receive address, RA), a transfer address (transfer address, TA), common information (Common Info), a plurality of pieces of user information (User Info), padding (Padding), and a frame check sequence (frame check sequence, FCS).

The common information may include: a trigger type (Trigger Type), an uplink length (UL Length), more trigger frames (More TFs), carrier sensing required (CS Required), and trigger dependent common information (Trigger Dependent Common Info).

The trigger type occupies 4 bits. A value of the trigger type ranges from 8 to 15. A value 8 of the trigger type represents a data slave trigger frame (data slave TF). The uplink length occupies 12 bits. The more trigger frames occupy 1 bit. The carrier sensing required occupies 1 bit.

The trigger dependent common information (Trigger Dependent Common Info) includes a transmission identifier (the transmission ID).

For example, during data exchange, a master AP and a slave AP may exchange only one data frame, or may need to exchange a plurality of data frames. If only one data frame is allowed to be exchanged during D-MIMO coordination, both the master AP and the slave AP determine that a unique data frame needs to be sent next. However, if a plurality of data frames are allowed to be exchanged, a data frame to be transmitted in current coordinated transmission needs to be indicated in a slave trigger frame. Therefore, a transmission ID needs to be introduced into the slave trigger frame to identify a data frame that needs to be transmitted in coordination. As shown in FIG. 8e, the transmission ID may be carried in the trigger dependent common info subfield. The transmission ID may alternatively be carried in another field, for example, a UL spatial reuse subfield in common info. Because a frame after the slave trigger frame is a downlink frame, the UL spatial reuse subfield is no longer needed. The transmission ID may alternatively be carried in a reserved (reserved) subfield in the common info field. The combination of the slave trigger type indication manner 1 and the slave AP indication manner 1 is used in FIG. 8e. Another slave trigger type indication manner and another slave AP indication manner may be used when the transmission ID is carried. The transmission ID is used in a data slave TF, and may also be applied to another type of slave TF. For example, when each transmission ID corresponds to a different type of data frame, physical layer transmission parameters that need to be used may also be different, so as to meet different requirements of different data types on throughput, delay, and robustness.

Figure 8F:
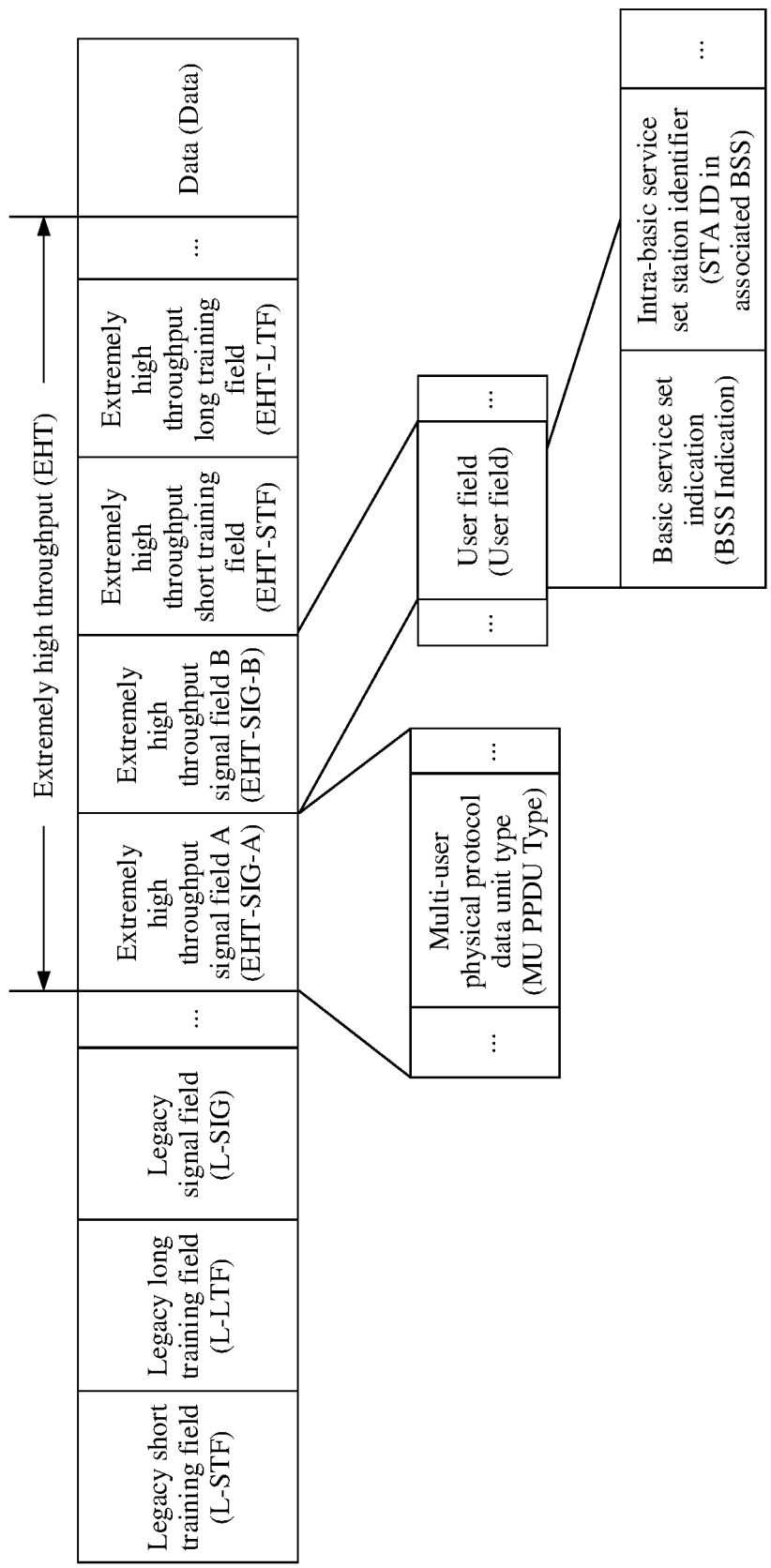
FIG. 8f is a schematic diagram of a composition structure of another slave trigger frame according to an embodiment of this application.

FIG. 8f is a schematic diagram of an EHT data packet structure according to an embodiment of this application. The EHT data packet structure may include: a non-high throughput short training field (non-HT Short Training Field, L-STF), a non-high throughput long training field (non-HT Long Training Field, L-LTF), a non-high throughput signal field (L-SIG), an extremely high throughput signal field A (EHT-SIG-A), an extremely high throughput signal field B (EHT-SIG-B), an extremely high throughput short training field (EHT-STF), and an extremely high throughput long training field (EHT-LTF).

The extremely high throughput signal field A (EHT-SIG-A) includes a multi-user physical protocol data unit type (MU PPDU Type).

The extremely high throughput signal field B (EHT-SIG-B) includes a user field (user field). The user field (user field) includes a basic service set indication (BSS Indication) and an intra-basic service set station identifier (a STA ID in an associated BSS).

For example, after a master AP sends a data slave trigger (Data slave trigger) frame, a slave AP is to send a data frame in a D-MIMO manner. When the slave AP sends data to a station, an EHT single user (single user, SU) PPDU may directly be used for transmission. However, when data is sent to a plurality of stations at the same time, because STA AIDs are not unique, a design of an EHT-SIG-B during transmission of an inter-BSS MU PPDU may be different from that of an EHT-SIG-B in an EHT MU PPDU sent by a single AP in a non-coordinated case. To distinguish between the two cases, an MU PPDU type field may be set in the EHT-SIG-A. When the field is set to a second value (for example, 0), it indicates that a current PPDU is an intra-BSS MU PPDU. When the field is set to a third value (for example, 1), it indicates that a current PPDU is an inter-BSS MU PPDU. For the foregoing problem that AIDs are not unique, as shown in FIG. 8f, a BSS corresponding to the STA may be identified by adding BSS indication to a user field, so as to uniquely identify the STA. The BSS indication may be a BSS color, a BSS ID, or a negotiated BSS identifier implemented in a collaboration group. Certainly, this implementation is also applicable to a case in which designs of an inter-BSS MU PPDU and an intra-BSS MU PPDU are different and that is caused by another problem other than the problem that the STA AIDs are not unique.

Field names in a PPDU are described in Table 2:

| Field name | Explanation |
| --- | --- |
| L-STF | Non-HT short training field, non-throughput short training field |
| L-LTF | Non-HT training field, legacy long training field |
| Field | name Explanation |
| L-SIG | Non-HT signal field, legacy signal field |
| EHT-SIG-A | EHT signal field A |
| EHT-SIG-A | EHT signal field B |
| EHT-STF | EHT short training field |
| EHT-LTF | EHT long training field |
| MU PPDU type | MU PPDU type field |
| User field | User field |
| Associated BSS | Associated BSS |

The foregoing embodiment provided in this application may be applicable to a scenario of a strong interaction between a plurality of APs. In this embodiment of this application, a frame structure of a slave TF is designed, thereby resolving a problem of how a master AP sends information to a slave AP in the scenario of a strong interaction between a plurality of APs.

Figure 9A:
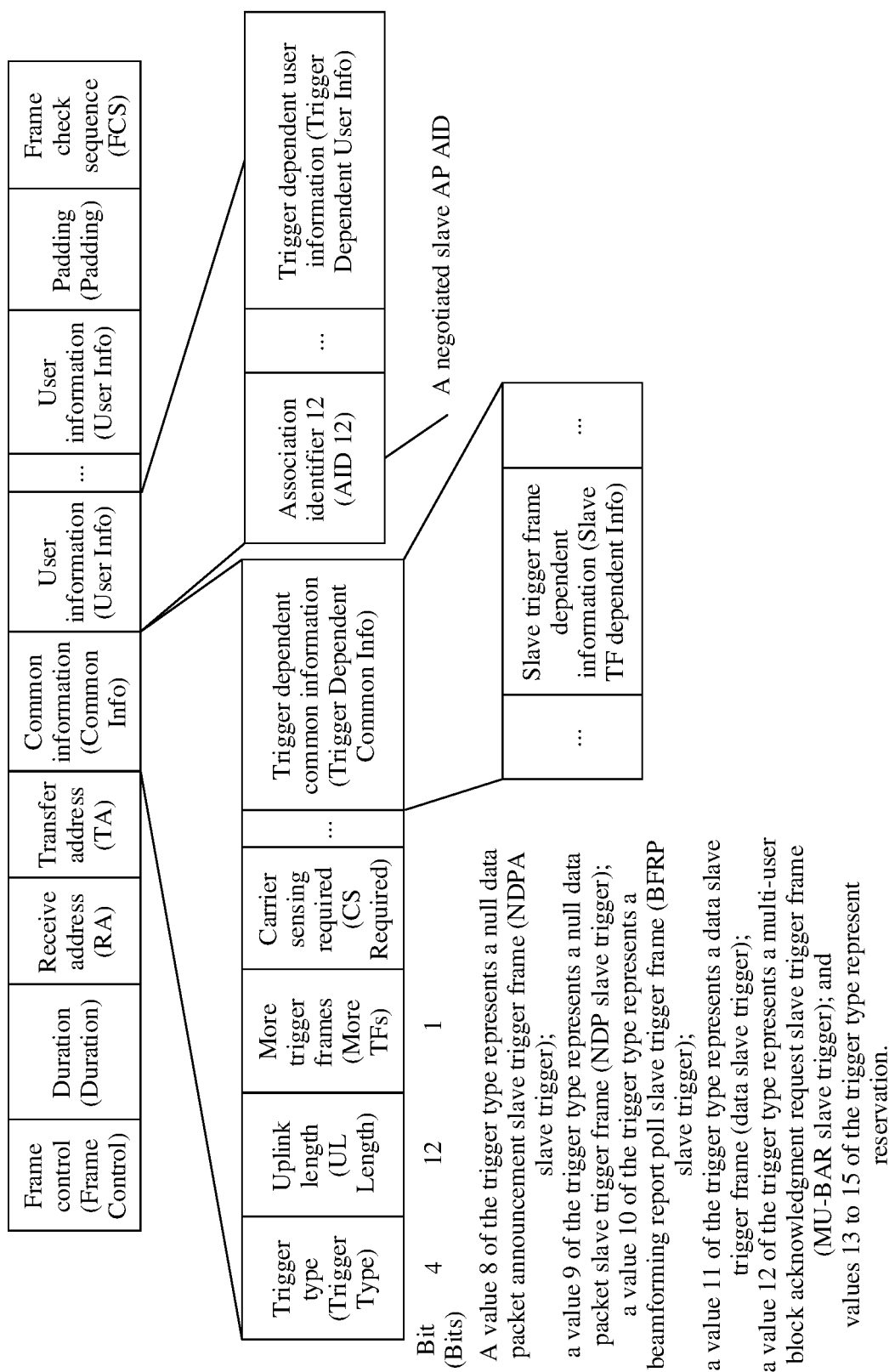
FIG. 9a is a schematic diagram of a composition structure of another slave trigger frame according to an embodiment of this application.

In some other embodiments of this application, as shown in FIG. 9a, a frame structure of a slave TF mainly includes the following composition structures: frame control (Frame Control), duration (Duration), a receive address (receive address, RA), a transfer address (transfer address, TA), common information (Common Info), a plurality of pieces of user information (User Info), padding (Padding), and a frame check sequence (frame check sequence, FCS).

The common information may include: a trigger type (Trigger Type), an uplink length (UL Length), more trigger frames (More TFs), carrier sensing required (CS Required), and trigger dependent common information (Trigger Dependent Common Info).

The trigger type occupies a plurality of bits, for example, 4 bits. A value of the trigger type ranges from 8 to 15. For example, a value 8 of the trigger type represents a null data packet announcement slave trigger frame (NDPA slave trigger), a value 9 of the trigger type represents a null data packet slave trigger frame (NDP slave trigger), a value 10 of the trigger type represents a beamforming report poll slave trigger frame (BFRP slave trigger), a value 11 of the trigger type represents a data slave trigger frame (data slave trigger), a value 12 of the trigger type represents a multi-user block acknowledgment request slave trigger frame (MU-BAR slave trigger), and values 13 to 15 of the trigger type represent reservation. The uplink length occupies 12 bits. The more trigger frames occupy 1 bit. The carrier sensing required occupies 1 bit.

The trigger dependent common information (Trigger Dependent Common Info) includes slave trigger frame dependent information (Slave TF dependent Info).

The user information may include an association identifier 12 (AID 12) and trigger dependent user information (Trigger Dependent User Info). The AID 12 may carry a negotiated slave AP AID.

Figure 9B:
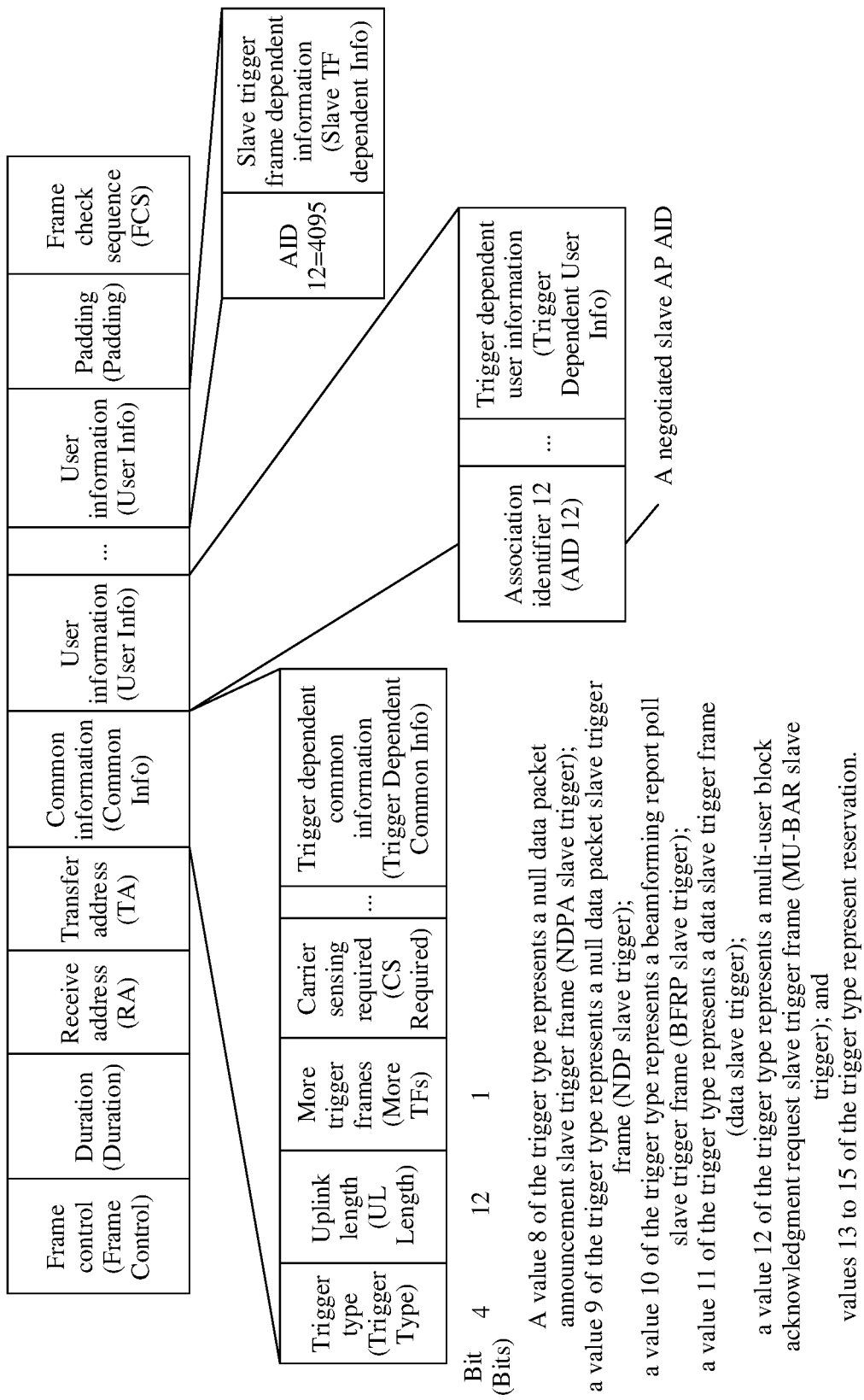
FIG. 9b is a schematic diagram of a composition structure of another slave trigger frame according to an embodiment of this application.

As shown in FIG. 9b, a frame structure of another slave TF mainly includes the following composition structures: frame control (Frame Control), duration (Duration), a receive address (receive address, RA), a transfer address (transfer address, TA), common information (Common Info), a plurality of pieces of user information (User Info), padding (Padding), and a frame check sequence (frame check sequence, FCS).

The common information may include: a trigger type (Trigger Type), an uplink length (UL Length), more trigger frames (More TFs), carrier sensing required (CS Required), and trigger dependent common information (Trigger Dependent Common Info).

The trigger type occupies 4 bits. A value of the trigger type ranges from 8 to 15. For example, a value 8 of the trigger type represents a null data packet announcement slave trigger frame (NDPA slave trigger), a value 9 of the trigger type represents a null data packet slave trigger frame (NDP slave trigger), a value 10 of the trigger type represents a beamforming report poll slave trigger frame (BFRP slave trigger), a value 11 of the trigger type represents a data slave trigger frame (data slave trigger), a value 12 of the trigger type represents a multi-user block acknowledgment request slave trigger frame (MU-BAR slave trigger), and values 13 to 15 of the trigger type represent reservation. The uplink length occupies 12 bits. The more trigger frames occupy 1 bit. The carrier sensing required occupies 1 bit.

The trigger dependent common information (Trigger Dependent Common Info) includes slave trigger frame dependent information (Slave TF dependent Info).

One piece of user information may include an association identifier 12 (AID 12) and trigger dependent user information (Trigger Dependent User Info). The AID 12 may carry a negotiated slave AP AID.

Another piece of user information may include an AID 12 and slave trigger frame dependent information (Slave TF dependent Info). The AID 12=4095.

The foregoing embodiment provided in this application may be applicable to a scenario of a weak interaction between a plurality of APs. In this scenario, a master AP and a slave AP exchange only a data frame, but do not negotiate a signaling setting and scheduling information that are required for coordinated data transmission. A physical layer resource is obtained randomly, and is related to bandwidth that can be obtained currently and a channel state. Scheduling information and a signaling setting that are obtained before sending are more accurate than scheduling information and a signaling setting that are planned in advance.

In this embodiment, different slave trigger frames need to carry different scheduling signaling. Therefore, a field needs to be introduced. In this embodiment of this application, the field is referred to as a slave trigger frame dependent information (slave TF dependent info) subfield. In an implementation shown in FIG. 9a, a slave TF dependent info subfield is carried in a trigger dependent common info subfield. Another implementation is to set a slave TF info field after the last user info field. The slave TF info field includes an AID 12 subfield and a slave TF dependent info subfield. An AID 12 is set to a special value to identify that a field in which the AID 12 is located is the slave TF info field. That the AID 12 is a special value means that a corresponding AID has not been assigned to any STA.

As a special example, as shown in FIG. 9b, an AID 12 may be set to 4095. In a current standard, the AID 12 equal to 4095 is used to indicate a start of a padding (padding) field. After reading the AID 12 equal to 4095, a legacy station uses a remaining part as padding. In this embodiment of this application, after reading the first AID 12 equal to 4095 in the slave TF, a slave AP knows that it is a slave TF info field.

Content of slave TF dependent info subfields in different types of slave trigger frames is different. For example, the slave TF dependent info subfield includes two parts: physical layer-related information and MAC layer-related information. An NDPA, a BFRP, and an MU-BAR are usually sent in a non-throughput (non-HT) manner or a non-throughput duplicate (non-HT duplicate) manner. In the non-HT manner, 20 MHz bandwidth may be used for sending. In the non-HT duplicate manner, a non-HT frame format is repeatedly sent on each 20 MHz channel when the sending is performed on a channel with bandwidth greater than 20 MHz. In this implementation, the physical layer-related information is described by using the non-HT manner or the non-HT duplicate manner as an example. When another form of physical layer frame format is used for sending, indication information in a corresponding physical layer frame format is carried.

Figures 9C, 9D, 10:
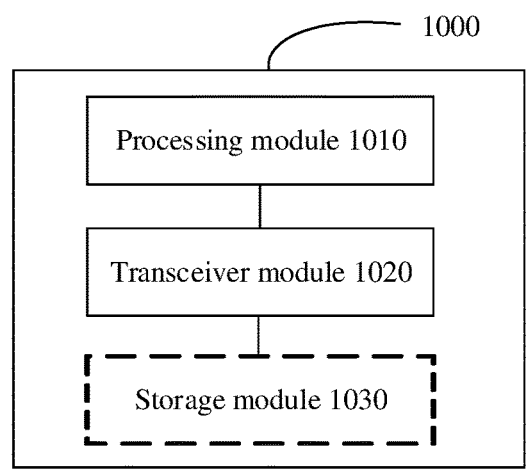
FIG. 9c is a schematic diagram of a composition structure of a physical layer information field according to an embodiment of this application.
FIG. 9d is a schematic diagram of a composition structure of an NDPA slave trigger frame according to an embodiment of this application.
FIG. 10 is a schematic diagram of a composition structure of a communications apparatus according to an embodiment of this application.

When a plurality of physical layer formats may be used for sending, the slave TF dependent info subfield further needs to include physical layer frame format indication information to indicate a physical layer frame format to be subsequently used for a frame for sending. When the non-HT manner or the non-HT duplicated manner is used for sending. As shown in FIG. 9c, because in a physical layer signal (SIGNAL) field, a slave TF dependent info field needs to carry information such as a rate (RATE), reservation, a length (LENGTH), parity (parity), and a signal tail (SIGNAL Tail). In an EHT standard, an NDP is sent by using an EHT SU PPDU format, and an NDP slave trigger frame carries an EHT-SIG-A field in an EHT SU PPDU. A specific EHT-SIG-A content form of the NDP is not limited.

A data frame may be sent by using an EHT SU PPDU or EHT MU PPDU format. When the data frame is sent by using the EHT SU PPDU format, physical layer-related information of a slave TF dependent info subfield in a corresponding data slave trigger frame includes information about an EHT-SIG-A field carrying an EHT SU PPDU. When the data frame is sent by using EHT MU PPDU format, physical layer-related information of a slave TF dependent info subfield in a corresponding data slave trigger frame includes information about an EHT-SIG-A field and an EHT-SIG-B field carrying an EHT MU PPDU. A specific EHT-SIG-A content form and a specific EHT-SIG-B content form are not limited.

As shown in FIG. 9d, an NDPA slave trigger frame may include a sounding dialog token (Sounding Dialog Token), station information 1 (STA Info 1), . . . , and station information n (STA Info n). FIG. 9d shows content of a MAC part in a slave TF dependent info subfield in the NDPA slave trigger frame. Information is carried in a corresponding slave trigger frame, so that a master AP and a slave AP can send an NDPA, a BFRP, and an MU-BAR consistently. A slave TF dependent info field in each of a BFRP slave trigger frame and an MU-BAR slave trigger frame needs to include a corresponding common info field and user info field in a BFRP frame and an MU-BAR frame. Illustrations are not described one by one herein.

The foregoing embodiment provided in this application may be applicable to a scenario of a weak interaction between a plurality of APs. In this embodiment of this application, a frame structure of a slave TF is designed, thereby resolving a problem of how a master AP sends information to a slave AP in the scenario of a weak interaction between a plurality of APs. By using the frame structure of the slave TF and the PPDU structure design, D-MIMO transmission can be implemented between the master AP and the slave AP.

The method provided in the embodiments of this application is described in the foregoing embodiments, and a communications apparatus provided in the embodiments of this application is described below. The communications apparatus may include any one of the first AP and the second AP that are described above.

FIG. 10 is a schematic block diagram of a communications apparatus 1000 according to an embodiment of this application. In an embodiment, the apparatus 1000 shown in FIG. 10 may correspond to the communications apparatus in the foregoing method embodiments, and may have any function of the first access point or the second access point in the method. Optionally, the apparatus 1000 in this embodiment of this application may be a first access point, or may be a chip in a first access point. The apparatus 1000 in this embodiment of this application may be a second access point, or may be a chip in a second access point. The apparatus 1000 may include a processing module 1010 and a transceiver module 1020. Optionally, the apparatus 1000 may further include a storage module 1030.

In an implementation, the apparatus 1000 is a first access point or a chip in a first access point.

For example, the processing module 1010 may be configured to generate the signaling or data information sent in the foregoing method embodiments, for example, generate the slave trigger frame sent in step 301; and may further be configured to control, based on the slave trigger frame, the transceiver module 1020 to complete transmission of the slave trigger frame to a second AP. For example, step 302 may be performed.

The transceiver module 1020 is configured to support the first access point (AP) in communicating with the second AP, a station, or another node. The transceiver module may include a receiving module and a sending module. The sending module may be configured to perform step 302 in the foregoing method embodiment.

In another implementation, the apparatus 1000 is a second access point or a chip in a second access point.

The processing module 1010 may be configured to generate the signaling or data information sent in the foregoing method embodiments, for example, generate the PPDU sent in step 304; may further be configured to determine a type of a slave trigger frame; and may further be configured to control, based on the slave trigger frame, the transceiver module 1020 to send the PPDU to a STA, where the PPDU carries a frame corresponding to the type of the slave trigger frame.

The transceiver module 1020 is configured to support the second access point (AP) in communicating with the first AP, a station, or another node. The transceiver module may include a receiving module and a sending module. The sending module may be configured to perform step 304 in the foregoing method embodiment. The receiving module may be configured to perform step 303 in the foregoing method embodiment.

It should be understood that the apparatus 1000 according to this embodiment of this application may correspond to the first access point or the second access point in the methods in the foregoing embodiments, and the foregoing and other management operations and/or functions of the modules in the apparatus 1000 are respectively used to implement corresponding steps of the foregoing methods. For brevity, details are not described herein again.

Alternatively, the apparatus 1000 may be configured as a general processing system, for example, commonly referred to as a chip. The processing module 1010 may include one or more processors providing processing functions. The transceiver module 1020 may be, for example, an input/output interface, a pin, a circuit, or the like. The input/output interface may be configured to be responsible for information interaction between the chip system and the outside. For example, the input/output interface may output transmission control information generated by the first access point (AP) to another module outside the chip for processing. The processing module may execute computer execution instructions stored in the storage module, to implement functions of the first access point in the foregoing method embodiments. In an example, the storage module 1030 optionally included in the apparatus 1000 may be a storage unit in a chip, such as a register or a buffer; or may be a storage unit outside a chip, such as a read-only memory (read-only memory, ROM for short) or another type of static storage device, random access memory (random access memory, RAM for short), or the like that can store static information and instructions.

Figure 11:
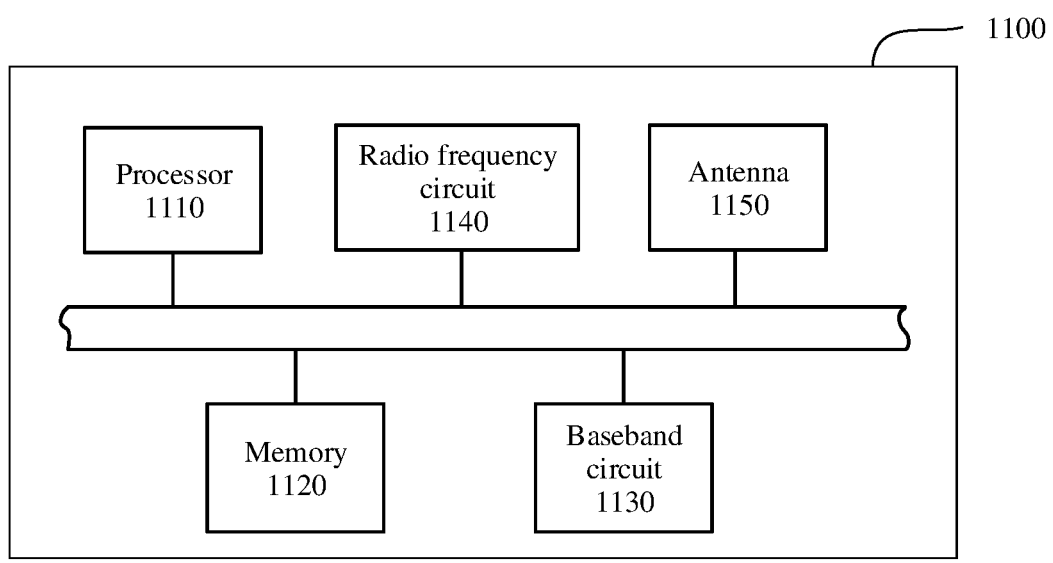
FIG. 11 is a schematic diagram of a composition structure of another communications apparatus according to an embodiment of this application.

In another example, FIG. 11 is a schematic block diagram of another communications apparatus 1100 according to an embodiment of this application. The apparatus 1100 in this embodiment of this application may be the first access point or the second access point in the foregoing method embodiments, and the apparatus 1100 may be configured to perform some or all functions of the first access point or the second access point in the foregoing method embodiments. The apparatus 1100 may include a processor 1110, a baseband circuit 1130, a radio frequency circuit 1140, and an antenna 1150. Optionally, the apparatus 1100 may further include a memory 1120. Components of the apparatus 1100 are coupled together by using a bus. In addition to a data bus, the bus system further includes a power bus, a control bus, and a status signal bus. However, for clear description, various types of buses in the figure are marked as the bus system.

The processor 1110 may be configured to: control the first access point or the second access point, and perform processing performed by the first access point or the second access point in the foregoing embodiments; may perform processing processes related to the first access point or the second access point in the foregoing method embodiments and/or other processes used in the technologies described in this application; and further, may run an operating system, manage a bus, and execute a program or instructions stored in the memory.

The baseband circuit 1130, the radio frequency circuit 1140, and the antenna 1150 may be configured to support the first access point and the second access point or station in the foregoing embodiments in transmitting and receiving information, so as to support wireless communication between the first access point and another node. For example, transmission control information sent by the first access point may be processed by the processor 1110; and baseband processing, such as protocol-based encapsulation and encoding, is performed by the baseband circuit 1130 on the transmission control information. After radio frequency processing, such as analog conversion, filtering, amplification, and up-conversion, is further performed by the radio frequency circuit 1140 on the transmission control information, the transmission control information is sent to the second access point (AP) via the antenna 1150. It may be understood that the baseband circuit 1130, the radio frequency circuit 1140, and the antenna 1150 may further be configured to support the first access point in communicating with another network entity.

The memory 1120 may be configured to store program code and data of the first access point or the second access point. The memory 1120 may be the storage module 1030 in FIG. 10. The memory 1120 is shown in FIG. 11 as being separated from the processor 1110. However, a person skilled in the art can readily figure out that the memory 1120 or any portion thereof may be located outside the apparatus 1100. For example, the memory 1120 may include a transmission line and/or a computer product separated from a wireless node, and these media may be accessed by the processor 1110 through a bus interface. Alternatively, the memory 1120 or any portion thereof may be integrated into the processor 1110, for example, may be a cache and/or a general purpose register.

In an example, in FIG. 10, the transceiver module 1020 may include a baseband circuit 1130, a radio frequency circuit 1140, and an antenna 1150; and the processing module 1010 may be a processor 1110. In another example, in FIG. 10, the transceiver module 1020 may include only the antenna in FIG. 11; and the processing module 1010 may include not only a processor 1110, but also a radio frequency circuit 1140 and a baseband circuit 1130. In still another example, in FIG. 10, the processing module 1010 may include a processor 1110 and a baseband circuit 1130; and the transceiver module 1020 may include a radio frequency circuit 1140 and an antenna 1150.

It may be understood that FIG. 11 shows only a simplified design of the first access point or the second access point. For example, in actual application, the first access point or the second access point may include any quantity of transmitters, receivers, processors, memories, and the like. All first access points or second access points that can implement the embodiments of this application fall within the protection scope of the embodiments of this application.

An embodiment of this application further provides a computer storage medium. The computer-readable storage medium stores instructions, and the instructions may be executed by one or more processors on a processing circuit. When the instructions are run on a computer, the computer is enabled to perform the methods according to the foregoing aspects.

An embodiment of this application further provides a chip system. The chip system includes a processor, configured to support a distributed unit, a centralized unit, and a first access point or a second access point in implementing functions in the foregoing embodiments, for example, generating or processing the data and/or information in the foregoing methods.

In a possible design, the chip system may further include a memory. The memory is configured to store program instructions and data that are necessary for the distributed unit, the centralized unit, and the first access point or the second access point. The chip system may include a chip, or may include a chip and another discrete component.

An embodiment of this application further provides a processor, configured to: be coupled to a memory, and perform the method and the function related to the first access point (AP) in any one of the foregoing embodiments.

An embodiment of this application further provides a processor, configured to: be coupled to a memory, and perform the method and the function related to the second access point (AP) in any one of the foregoing embodiments.

An embodiment of this application further provides a computer program product including an instruction. When the computer program product runs on a computer, the computer is enabled to perform the method and the function related to the first access point (AP) in any one of the foregoing embodiments.

An embodiment of this application further provides a computer program product including an instruction. When the computer program product runs on a computer, the computer is enabled to perform the method and the function related to the second access point (AP) in any one of the foregoing embodiments.

An embodiment of this application further provides a wireless communications system. The system includes the first access point and at least one second access point in the foregoing embodiments.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

What is claimed is:

1. An information transmission method, comprising:
generating, by a first access point (AP), a slave AP trigger frame, wherein the slave AP trigger frame comprises a trigger type information field or subfield, AP indication information, and a transmission identifier field, the trigger type information field or subfield of the slave AP trigger frame indicates a trigger type of the slave AP trigger frame, the AP indication information comprises an identifier of a second AP, the identifier of the second AP indicates the second AP, the transmission identifier field identifying a frame to be transmitted in coordination, the slave AP trigger frame is configured to trigger the second AP to send a physical protocol data unit (PPDU), and the PPDU carries the frame corresponding to the trigger type of the slave AP trigger frame, wherein the slave AP trigger frame comprises a null data packet announcement (NDPA) channel sounding subtype frame, or a null data packet (NDP) channel sounding subtype frame, or a beamforming report poll (BFRP) channel sounding subtype frame; and sending, by the first AP, the slave AP trigger frame addressing the second AP, thereby slaving an operation of the second AP triggered by the slave AP trigger frame.

2. An information receiving method, comprising:
receiving, by a second access point (AP), a slave AP trigger frame sent by a first AP to the second AP, wherein the slave AP trigger frame comprises a trigger type information field or subfield, AP indication information, and a transmission identifier field, the trigger type information field or subfield of the slave AP trigger frame indicates a trigger type of the slave AP trigger frame, the AP indication information comprises an identifier of the second AP, the identifier of the second AP indicates the second AP, the transmission identifier field identifying a frame to be transmitted in coordination, the slave AP trigger frame is configured to address and trigger the second AP to send a physical protocol data unit (PPDU) thereby slaving an operation of the second AP triggered by the slave AP trigger frame, and the PPDU carries the frame corresponding to the trigger type of the slave AP trigger frame, wherein the slave AP trigger frame comprises a null data packet announcement (NDPA) channel sounding subtype frame, or a null data packet (NDP) channel sounding subtype frame, or a beamforming report poll (BFRP) channel sounding subtype frame; and sending, by the second AP, the PPDU to a station (STA) based on the trigger type information field or subfield and the AP indication information.

3. The method according to claim 1, wherein the slave AP trigger frame comprises a common information field, a trigger type subfield in the common information field comprises the trigger type information field or subfield, and a plurality of values of the trigger type subfield are in a one-to-one correspondence with a plurality of trigger types of the slave AP trigger frame; or the slave AP trigger frame comprises a common information field, a trigger type subfield in the common information field carries a first value, a trigger dependent common information subfield in the common information field comprises the trigger type information field or subfield, and a plurality of values of the trigger dependent common information subfield are in a one-to-one correspondence with a plurality of trigger types of the slave AP trigger frame; or the slave AP trigger frame comprises a common information field and a user information field, a trigger type subfield in the common information field carries a first value, a slave trigger frame type subfield in the user information field comprises the trigger type information field or subfield, and a plurality of values of the slave trigger frame type subfield are in a one-to-one correspondence with a plurality of trigger types of the slave AP trigger frame.

4. The method according to claim 1, wherein the slave AP trigger frame comprises a user information field, and an association identifier (AID) subfield in the user information field carries the AP indication information; or the slave AP trigger frame comprises a user information field, an association identifier subfield in the user information field is a special AID, and a trigger dependent user information subfield in the user information field carries the AP indication information.

5. The method according to claim 4, wherein the identifier of the second AP is at least one of the following: a basic service set (BSS) identifier (ID) corresponding to the second AP, a basic service set color corresponding to the second AP, an association identifier of the second AP, or a medium access control (MAC) address of the second AP.

6. The method according to claim 1, wherein the slave AP trigger frame further comprises transmission parameter information, and the transmission parameter information indicates a transmission parameter of the PPDU;
the slave AP trigger frame comprises a common information field; and
a trigger dependent common information subfield in the common information field carries the transmission parameter information.

7. A communications apparatus, wherein the apparatus is used on a first access point (AP), and the communications apparatus comprises a processor and a transceiver operatively connected to the processor, wherein
the processor is configured to perform operations comprising generating a slave AP trigger frame, wherein the slave AP trigger frame comprises a trigger type information field or subfield, AP indication information, and a transmission identifier field, the trigger type information field or subfield indicates a trigger type of the slave AP trigger frame, and the AP indication information comprises an identifier of a second AP; the identifier of the second AP addresses the second AP, and the transmission identifier field identifying a frame to be transmitted in coordination, the slave AP trigger frame is configured to trigger the second AP to send a physical protocol data unit (PPDU), and the PPDU comprises the frame corresponding to the trigger type of the slave AP trigger frame, wherein the slave AP trigger frame comprises a null data packet announcement (NDPA) channel sounding subtype frame, or a null data packet (NDP) channel sounding subtype frame, or a beamforming report poll (BFRP) channel sounding subtype frame; and
the processor is further configured to send the slave AP trigger frame to the second AP by using the transceiver thereby slaving an operation of the second AP triggered by the slave AP trigger frame.

8. The communications apparatus according to claim 7, wherein the slave AP trigger frame comprises a common information field, and a trigger type subfield in the common information field comprises the trigger type information field or subfield; and a plurality of values of the trigger type subfield are in a one-to-one correspondence with a plurality of trigger types of the slave AP trigger frame; or the slave AP trigger frame comprises a common information field, a trigger type subfield in the common information field carries a first value, and a trigger dependent common information subfield in the common information field comprises the trigger type information field or subfield; and a plurality of values of the trigger dependent common information subfield are in a one-to-one correspondence with a plurality of trigger types of the slave AP trigger frame; or the slave AP trigger frame comprises a common information field and a user information field, a trigger type subfield in the common information field carries a first value, and a slave trigger frame type subfield in the user information field comprises the trigger type information field or subfield; and a plurality of values in the slave trigger frame type subfield are in a one-to-one correspondence with a plurality of trigger types of the slave AP trigger frame.

9. The communications apparatus according to claim 7, wherein the slave AP trigger frame comprises a user information field, and an association identifier (AID) field in the user information field carries the AP indication information; or the slave AP trigger frame comprises a user information field, an association identifier subfield in the user information field is a special AID, and a trigger dependent user information subfield in the user information field carries the AP indication information.

10. The communications apparatus according to claim 9, wherein the identifier of the second AP is at least one of the following: a basic service set (BSS) identifier (ID) corresponding to the second AP, a basic service set color corresponding to the second AP, an association identifier of the second AP, or a media access control (MAC) address of the second AP.

* * * * *

UNITED STATES PATENT AND TRADEMARK OFFICE
CERTIFICATE OF CORRECTION

Page 1 of 1

PATENT NO. : 12,457,016 B2
APPLICATION NO. : 17/468862
DATED : October 28, 2025
INVENTOR(S) : Mao Yang et al.

It is certified that error appears in the above-identified patent and that said Letters Patent is hereby corrected as shown below:

On the Title Page

Item (54), and In the Specification, Column 1 Line 1, the title is corrected to "TRANSMISSION AND RECEIVING METHOD AND APPARATUS FOR USING TRIGGER FRAMES TO SCHEDULE A SECOND ACCESS POINT"

Signed and Sealed this
Tenth Day of February, 2026

John A. Squires
*Director of the United States Patent and Trademark Office*